US008970740B2

(12) United States Patent
Herman et al.

(10) Patent No.: US 8,970,740 B2
(45) Date of Patent: Mar. 3, 2015

(54) OVERLAP PATTERNS AND IMAGE STITCHING FOR MULTIPLE-DETECTOR COMPRESSIVE-SENSING CAMERA

(71) Applicant: InView Technology Corporation, Austin, TX (US)

(72) Inventors: Matthew A. Herman, Austin, TX (US); Donna E. Hewitt, Austin, TX (US); Tyler H. Weston, Austin, TX (US); Lenore McMackin, Austin, TX (US)

(73) Assignee: In View Technology Corporation, Austin, TX (US)

( * ) Notice: Subject to any disclaimer, the term of this patent is extended or adjusted under 35 U.S.C. 154(b) by 0 days.

(21) Appl. No.: 14/106,542

(22) Filed: Dec. 13, 2013

(65) Prior Publication Data

US 2014/0168482 A1    Jun. 19, 2014

Related U.S. Application Data

(60) Provisional application No. 61/737,401, filed on Dec. 14, 2012.

(51) Int. Cl.
*H04N 5/217* (2011.01)
*G06T 5/00* (2006.01)
*G06T 5/50* (2006.01)

(52) U.S. Cl.
CPC . *G06T 5/001* (2013.01); *G06T 5/50* (2013.01); *G06T 2207/10052* (2013.01); *G06T 2207/20212* (2013.01)
USPC .......................................................... 348/241

(58) Field of Classification Search
USPC ............................................... 348/241, 222.1
See application file for complete search history.

(56) References Cited

U.S. PATENT DOCUMENTS

| 6,097,456 | A * | 8/2000 | Wang | 349/105 |
|---|---|---|---|---|
| 2004/0239822 | A1* | 12/2004 | Kamijima et al. | 349/5 |
| 2005/0185143 | A1* | 8/2005 | Bossche et al. | 353/31 |
| 2009/0040294 | A1* | 2/2009 | Smalley et al. | 348/40 |
| 2009/0244272 | A1* | 10/2009 | MacAulay et al. | 348/76 |
| 2009/0278918 | A1* | 11/2009 | Marcus et al. | 348/54 |
| 2010/0149311 | A1* | 6/2010 | Kroll et al. | 348/40 |

* cited by examiner

*Primary Examiner* — Lin Ye
*Assistant Examiner* — Amy Hsu
(74) *Attorney, Agent, or Firm* — Meyertons Hood Kivlin Kowert & Goetzel, P.C.; Jeffrey C. Hood; Mark K. Brightwell

(57) ABSTRACT

A mechanism for reconstructing sub-images based on measurement data acquired by an imaging system including an array of light modulating elements and an array of photodetectors. Each sub-image is reconstructed based on samples from a respective photodetector and a respective set of measurement patterns defined on a respective virtual sub-region on the modulating array. Each virtual sub-region is configured to include at least the light modulating elements that are able to send a non-trivial amount of light to the respective photodetector during a pattern application period. The virtual sub-regions overlap because many light modulating elements are capable of sending light to more than one photodetector. Whenever a measurement pattern of one virtual sub-region overlaps the measurement pattern of a neighboring virtual sub-region, the two measurement patterns agree by design. Thus, the measurement patterns for the collection of virtual sub-regions combine to form a pattern on the whole modulating array.

19 Claims, 18 Drawing Sheets

| | | | | | | | |
|---|---|---|---|---|---|---|---|
| 8 | 16 | 24 | 32 |
| 7 | 15 | 23 | 31 |
| 6 | 14 | 22 | 30 |
| 5 | 13 | 21 | 29 |
| 4 | 12 | 20 | 28 |
| 3 | 11 | 19 | 27 |
| 2 | 10 | 18 | 26 |
| 1 | 9 | 17 | 25 |

Modulator Surface Partitioned into Physical Sub-Regions

*FIG. 8A*

Type I

| A | B | C |
|---|---|---|
| D | E | F |
| G | H | I |

FIG. 9A

Type II

| C | B | A |
|---|---|---|
| F | E | D |
| I | H | G |

FIG. 9B

Type III

| G | H | I |
|---|---|---|
| D | E | F |
| A | B | C |

FIG. 9C

Type IV

| I | H | G |
|---|---|---|
| F | E | D |
| C | B | A |

FIG. 9D reconstruct sub-images of an image corresponding respectively to virtual sub-regions of the light modulation unit, wherein each of the virtual sub-regions is a proper superset of a respective one of the physical sub-regions, wherein each adjacent pair of the virtual sub-regions overlap, wherein each sub-image corresponds to a respective one of the light sensing elements and is reconstructed using: (a) a respective one of the sample sets and (b) a restriction of the spatial patterns to the corresponding virtual sub-region of the light modulation unit 1510

FIG. 15

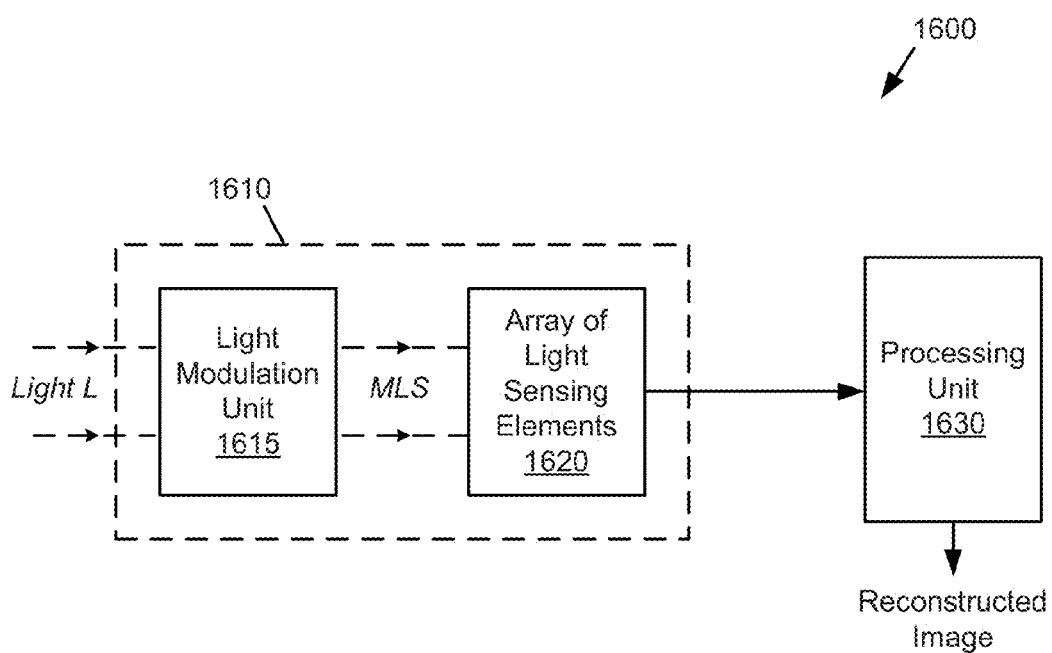

FIG. 16

OVERLAP PATTERNS AND IMAGE STITCHING FOR MULTIPLE-DETECTOR COMPRESSIVE-SENSING CAMERA

RELATED APPLICATION DATA

This application claims the benefit of priority to U.S. Provisional Application No. 61/737,401, filed on Dec. 14, 2012, entitled "Overlap Patterns and Image Stitching for Multiple-Diode CS Camera", invented by Herman et al., which is hereby incorporated by reference in its entirety as though fully and completely set forth herein.

GOVERNMENT LICENSE RIGHTS

This invention was made with Government support under Contract No. 2009*0674524*000 awarded by the Central Intelligence Agency. The Government has certain rights in the invention.

FIELD OF THE INVENTION

The present invention relates to the field of compressive sensing, and more particularly, to a method for reconstructing images acquired using a light modulator and a parallel array of light detectors whose fields of view partially overlap.

DESCRIPTION OF THE RELATED ART

According to Nyquist theory, a signal x(t) whose signal energy is supported on the frequency interval [−B,B] may be reconstructed from samples {x(nT)} of the signal x(t), provided the rate $f_S=1/T_S$ at which the samples are captured is sufficiently high, i.e., provided that $f_S$ is greater than 2B. Similarly, for a signal whose signal energy is supported on the frequency interval [A,B], the signal may be reconstructed from samples captured with sample rate greater than B−A. A fundamental problem with any attempt to capture a signal x(t) according to Nyquist theory is the large number of samples that are generated, especially when B (or B−A) is large. The large number of samples is taxing on memory resources and on the capacity of transmission channels.

Nyquist theory is not limited to functions of time. Indeed, Nyquist theory applies more generally to any function of one or more real variables. For example, Nyquist theory applies to functions of two spatial variables such as images, to functions of time and two spatial variables such as video, and to the functions used in multispectral imaging, hyperspectral imaging, medical imaging and a wide variety of other applications. In the case of an image I(x,y) that depends on spatial variables x and y, the image may be reconstructed from samples of the image, provided the samples are captured with sufficiently high spatial density. For example, given samples {I(nΔx, mΔy)} captured along a rectangular grid, the horizontal and vertical densities 1/Δx and 1/Δy should be respectively greater than $2B_x$ and $2B_y$, where $B_x$ and $B_y$ are the highest x and y spatial frequencies occurring in the image I(x,y). The same problem of overwhelming data volume is experienced when attempting to capture an image according to Nyquist theory. The modern theory of compressive sensing is directed to such problems.

Compressive sensing relies on the observation that many signals (e.g., images or video sequences) of practical interest are not only band-limited but also sparse or approximately sparse when represented using an appropriate choice of transformation, for example, a transformation such as a Fourier transform, a wavelet transform or a discrete cosine transform (DCT). A signal vector v is said to be K-sparse with respect to a given transformation T when the transformation of the signal vector, Tv, has no more than K non-zero coefficients. A signal vector v is said to be sparse with respect to a given transformation T when it is K-sparse with respect to that transformation for some integer K much smaller than the number L of components in the transformation vector Tv.

A signal vector v is said to be approximately K-sparse with respect to a given transformation T when the coefficients of the transformation vector, Tv, are dominated by the K largest coefficients (i.e., largest in the sense of magnitude or absolute value). In other words, if the K largest coefficients account for a high percentage of the energy in the entire set of coefficients, then the signal vector v is approximately K-sparse with respect to transformation T. A signal vector v is said to be approximately sparse with respect to a given transformation T when it is approximately K-sparse with respect to the transformation T for some integer K much less than the number L of components in the transformation vector Tv.

Given a sensing device that captures images with N samples per image and in conformity to the Nyquist condition on spatial rates, it is often the case that there exists some transformation and some integer K very much smaller than N such that the transform of each captured image will be approximately K sparse. The set of K dominant coefficients may vary from one image to the next. Furthermore, the value of K and the selection of the transformation may vary from one context (e.g., imaging application) to the next. Examples of typical transforms that might work in different contexts include the Fourier transform, the wavelet transform, the DCT, the Gabor transform, etc.

Compressive sensing specifies a way of operating on the N samples of an image so as to generate a much smaller set of samples from which the N samples may be reconstructed, given knowledge of the transform under which the image is sparse (or approximately sparse). In particular, compressive sensing invites one to think of the N samples as a vector v in an N-dimensional space and to imagine projecting the vector v onto each vector in a series of M vectors {R(i): i=1, 2, . . . , M} in the N-dimensional space, where M is larger than K but still much smaller than N. Each projection gives a corresponding real number S(i), e.g., according to the expression $$S(i)=<v,R(i)>,$$

where the notation <v,R(i)> represents the inner product (or dot product) of the vector v and the vector R(i). Thus, the series of M projections gives a vector U including M real numbers: $U_i=S(i)$. Compressive sensing theory further prescribes methods for reconstructing (or estimating) the vector v of N samples from the vector U of M real numbers and the series of measurement vectors {R(i): i=1, 2, . . . , M}. For example, according to one method, one should determine the vector x that has the smallest length (in the sense of the $L_1$ norm) subject to the condition that ΦTx=U, where Φ is a matrix whose rows are the transposes of the vectors R(i), where T is the transformation under which the image is K sparse or approximately K sparse.

Compressive sensing is important because, among other reasons, it allows reconstruction of an image based on M measurements instead of the much larger number of measurements N recommended by Nyquist theory. Thus, for example, a compressive sensing camera would be able to capture a significantly larger number of images for a given size of image store, and/or, transmit a significantly larger number of images per unit time through a communication channel of given capacity.

As mentioned above, compressive sensing operates by projecting the image vector v onto a series of M vectors. As discussed in U.S. Pat. No. 8,199,244, issued Jun. 12, 2012 (invented by Baraniuk et al.) and illustrated in FIG. 1, an imaging device (e.g., camera) may be configured to take advantage of the compressive sensing paradigm by using a digital micromirror device (DMD) 40. An incident lightfield 10 passes through a lens 20 and then interacts with the DMD 40. The DMD includes a two-dimensional array of micromirrors, each of which is configured to independently and controllably switch between two orientation states. Each micromirror reflects a corresponding portion of the incident light field based on its instantaneous orientation. Any micromirrors in a first of the two orientation states will reflect their corresponding light portions so that they pass through lens 50. Any micromirrors in a second of the two orientation states will reflect their corresponding light portions away from lens 50. Lens 50 serves to concentrate the light portions from micromirrors in the first orientation state onto a photodiode (or photodetector) situated at location 60. Thus, the photodiode generates a signal whose amplitude at any given time represents a sum of the intensities of the light portions from the micromirrors in the first orientation state.

The compressive sensing is implemented by driving the orientations of the micromirrors through a series of spatial patterns. Each spatial pattern specifies an orientation state for each of the micromirrors. The output signal of the photodiode is digitized by an A/D converter 70. In this fashion, the imaging device is able to capture a series of measurements $\{S(i)\}$ that represent inner products (dot products) between the incident light field and the series of spatial patterns without first acquiring the incident light field as a pixelized digital image. The incident light field corresponds to the vector v of the discussion above, and the spatial patterns correspond to the vectors R(i) of the discussion above.

The incident light field may be modeled by a function I(x,y,t) of two spatial variables and time. Assuming for the sake of discussion that the DMD comprises a rectangular array, the DMD implements a spatial modulation of the incident light field so that the light field leaving the DMD in the direction of the lens 50 might be modeled by $$\{I(n\Delta x, m\Delta y, t) * M(n,m,t)\}$$

where m and n are integer indices, where $I(n\Delta x, m\Delta y, t)$ represents the portion of the light field that is incident upon that $(n,m)^{th}$ mirror of the DMD at time t. The function $M(n,m,t)$ represents the orientation of the $(n,m)^{th}$ mirror of the DMD at time t. At sampling times, the function $M(n,m,t)$ equals one or zero, depending on the state of the digital control signal that controls the $(n,m)^{th}$ mirror. The condition $M(n,m,t)=1$ corresponds to the orientation state that reflects onto the path that leads to the lens 50. The condition $M(n,m,t)=0$ corresponds to the orientation state that reflects away from the lens 50.

The lens 50 concentrates the spatially-modulated light field $$\{I(n\Delta x, m\Delta y, t) * M(n,m,t)\}$$

onto a light sensitive surface of the photodiode. Thus, the lens and the photodiode together implement a spatial summation of the light portions in the spatially-modulated light field:

$$S(t) = \sum_{n,m} I(n\Delta x, m\Delta y, t) M(n, m, t).$$

Signal S(t) may be interpreted as the intensity at time t of the concentrated spot of light impinging upon the light sensing surface of the photodiode. The A/D converter captures measurements of S(t). In this fashion, the compressive sensing camera optically computes an inner product of the incident light field with each spatial pattern imposed on the mirrors. The multiplication portion of the inner product is implemented by the mirrors of the DMD. The summation portion of the inner product is implemented by the concentrating action of the lens and also the integrating action of the photodiode.

The above-described system may be used to acquire a sequence of images. However, to enable accurate reconstruction of each image, a sufficient number of spatial patterns needs to be applied by the DMD 40, and a corresponding number of samples need to be captured from the A/D converter 70. Because the DMD 40 applies the spatial patterns sequentially, and the pattern application rate of the DMD is limited, the frame rate attainable by the system is limited, even if it were endowed with an idealized processor capable of reconstructing each image instantaneously from its corresponding acquired sample set.

This problem of limited frame rate is addressed in U.S. patent application Ser. No. 13/197,304 (6381-00200), filed Aug. 3, 2011, entitled "Decreasing Image Acquisition Time for Compressive Imaging Devices", invented by Kelly, Baraniuk, McMackin, Bridge, Chatterjee and Weston, which is hereby incorporated by reference in its entirety as though fully and completely set forth herein. In particular, that patent application discloses the idea of using an array of light detectors arranged in parallel, with each light detector sensing the modulated light from a corresponding portion of the DMD surface. Thus, the DMD surface may be imagined as being partitioned into non-overlapping sub-regions, each of which nominally sends modulated light to a respective one of the light detectors. The samples captured from each detector may be used to reconstruct a corresponding sub-image, representing a corresponding portion of the camera's field of view. The sub-images may be combined to form an image representing the complete field of view. Because each light detector senses a smaller field of view than in the single-detector system, the number of spatial patterns required to effectively capture each image decreases, and thus, the acquisition time per image decreases.

Although this parallel detector system is an improvement over the single-detector system, it has a difficulty associated with the so-called "crosstalk" (or "cross over") of modulated light. Crosstalk is said to occur when a parcel of light from one of the sub-regions is sensed by a light detector other than the one to which the sub-region is nominally assigned. Micromirrors near the boundary of two sub-regions are most likely to generate such cross-over events.

In the prior art, the $k^{th}$ sub-image among the sub-images is reconstructed using the samples $\{S_k(i): i=1, 2, \ldots, M\}$ from the $k^{th}$ light sensing element and spatial subpatterns $\{R_k(i): i=1, 2, \ldots, M\}$ which are defined only on the $k^{th}$ non-overlapping sub-region. The spatial subpatterns $\{R_k(i): i=1, 2, \ldots, M\}$ may be interpreted as restrictions of the spatial patterns $\{R(i): i=1, 2, \ldots, M\}$ (on the whole micromirror array) to the $k^{th}$ non-overlapping sub-region. It is our observation that the prior art reconstruction method causes image reconstruction artifacts such as image noise and ghosting. Thus, there exists a need for improved reconstruction mechanisms for use with the parallel detector architecture of the CS camera.

SUMMARY

In one set of embodiments, a method for reconstructing an image using an imaging device may involve the following operations.

The imaging device may include a light modulation unit and an array of light sensing elements, where the light modulation unit includes an array of light modulating elements. The light modulation unit modulates an incident light stream with a temporal sequence of spatial patterns, wherein each of the light sensing elements receives modulated light predominantly from a respective one of an array of physical sub-regions of the light modulation unit but to a lesser degree from adjacent ones of the physical sub-regions due to optical crosstalk. Each of the light sensing elements generates a corresponding set of samples representing intensity over time of the modulated light that it receives.

The method may involve reconstructing sub-images of the image corresponding respectively to virtual sub-regions of the light modulation unit. Each of the virtual sub-regions is a proper superset of a respective one of the physical sub-regions. Furthermore, each adjacent pair of the virtual sub-regions overlap. Each sub-image corresponds to a respective one of the light sensing elements, and is reconstructed using: (a) a respective one of the sample sets and (b) a restriction of the spatial patterns to the corresponding virtual sub-region of the light modulation unit, wherein said reconstructing is performed by a processing unit. The spatial patterns may be configured so that, for each of the virtual sub-regions, the restriction of the spatial patterns to the virtual sub-region forms an incoherent measurement pattern set on the virtual sub-region.

The method may also involve combining (e.g., superposing) the sub-images to form the image, wherein said combining is performed by said processing unit.

The method may also involve displaying the image using a display device.

BRIEF DESCRIPTION OF THE DRAWINGS

A better understanding of the present invention can be obtained when the following detailed description of the preferred embodiments is considered in conjunction with the following drawings.

FIG. 8A illustrates a partitioning of the modulating surface of the spatial light modulator into a collection of non-overlapping physical sub-regions.

FIGS. 9A-D illustrates four different types of block permutations in the design of overlapping measurement patterns for virtual sub-regions, according to one embodiment.

FIG. 15 illustrates one embodiment of a method 1500 for reconstructing an image based on sample sets captured by an image device including a plurality of light sensing elements.

FIG. 16 illustrates one embodiment of a system 1600 for acquiring image measurement data and reconstructing an image from the data.

Figure 1:
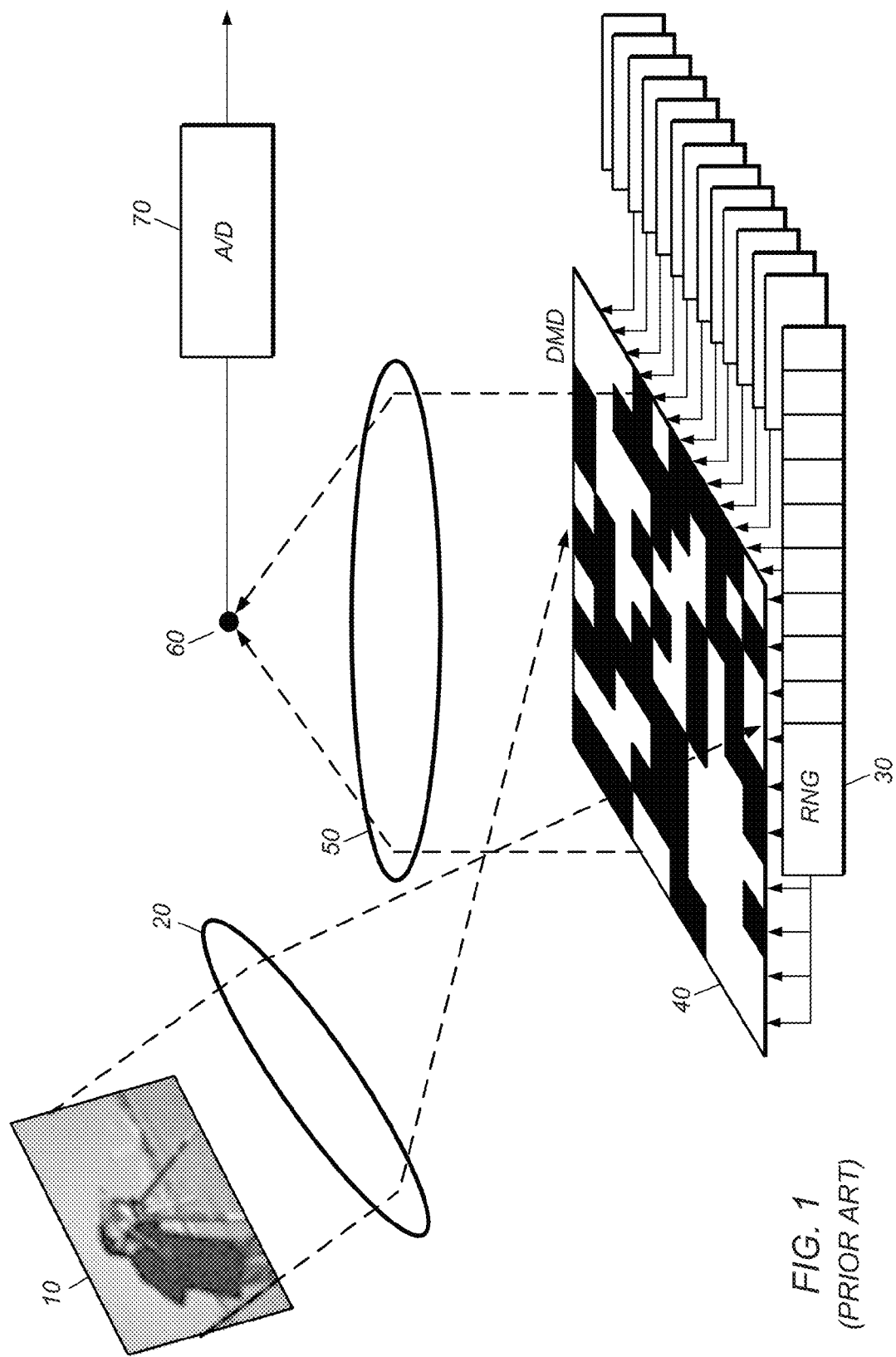
FIG. 1 illustrates a compressive sensing camera according to the prior art.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Terminology

A memory medium is a non-transitory medium configured for the storage and retrieval of information. Examples of memory media include: various kinds of semiconductor-based memory such as RAM and ROM; various kinds of magnetic media such as magnetic disk, tape, strip and film; various kinds of optical media such as CD-ROM and DVD-ROM; various media based on the storage of electrical charge and/or any of a wide variety of other physical quantities; media fabricated using various lithographic techniques; etc. The term "memory medium" includes within its scope of meaning the possibility that a given memory medium might be a union of two or more memory media that reside at different locations, e.g., on different chips in a system or on different computers in a network.

A computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

A computer system is any device (or combination of devices) having at least one processor that is configured to execute program instructions stored on a memory medium. Examples of computer systems include personal computers (PCs), workstations, laptop computers, tablet computers, mainframe computers, server computers, client computers, network or Internet appliances, hand-held devices, mobile devices, personal digital assistants (PDAs), tablet computers, computer-based television systems, grid computing systems, wearable computers, computers implanted in living organisms, computers embedded in head-mounted displays, computers embedded in sensors forming a distributed network, etc.

A programmable hardware element (PHE) is a hardware device that includes multiple programmable function blocks connected via a system of programmable interconnects. Examples of PHEs include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores).

As used herein, the term "light" is meant to encompass within its scope of meaning any electromagnetic radiation whose spectrum lies within the wavelength range $[\lambda_L, \lambda_U]$, where the wavelength range includes the visible spectrum, the ultra-violet (UV) spectrum, infrared (IR) spectrum and the terahertz (THz) spectrum. Thus, for example, visible radiation, or UV radiation, or IR radiation, or THz radiation, or any combination thereof is "light" as used herein.

In some embodiments, a computer system may be configured to include a processor (or a set of processors) and a memory medium, where the memory medium stores program instructions, where the processor is configured to read and execute the program instructions stored in the memory medium, where the program instructions are executable by the processor to implement a method, e.g., any of the various method embodiments described herein, or, any combination of the method embodiments described herein, or, any subset of any of the method embodiments described herein, or, any combination of such subsets.

System 100 for Operating on Light

Figure 2A:
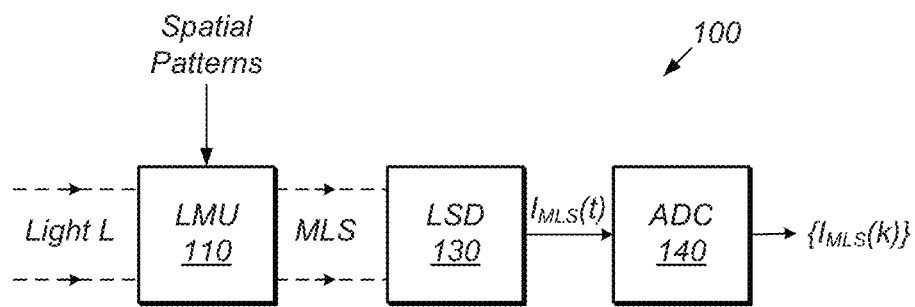
FIG. 2A illustrates one embodiment of a system 100 that is operable to capture compressive imaging samples and also samples of background light level. (LMU is an acronym for "light modulation unit". MLS is an acronym for "modulated light stream". LSD is an acronym for "light sensing device".)

A system 100 for operating on light may be configured as shown in FIG. 2A. The system 100 may include a light modulation unit 110, a light sensing device 130 and an analog-to-digital converter (ADC) 140.

The light modulation unit 110 is configured to modulate a received stream of light L with a series of spatial patterns in order to produce a modulated light stream (MLS). The spatial patterns of the series may be applied sequentially to the light stream so that successive time slices of the light stream are modulated, respectively, with successive ones of the spatial patterns. (The action of sequentially modulating the light stream L with the spatial patterns imposes the structure of time slices on the light stream.) The light modulation unit 110 includes a plurality of light modulating elements configured to modulate corresponding portions of the light stream. Each of the spatial patterns specifies an amount (or extent or value) of modulation for each of the light modulating elements. Mathematically, one might think of the light modulation unit's action of applying a given spatial pattern as performing an element-wise multiplication of a light field vector $(x_{ij})$ representing a time slice of the light stream L by a vector of scalar modulation values $(m_{ij})$ to obtain a time slice of the modulated light stream: $(m_{ij})*(x_{ij})=(m_{ij}*x_{ij})$. The vector $(m_{ij})$ is specified by the spatial pattern. Each light modulating element effectively scales (multiplies) the intensity of its corresponding light stream portion by the corresponding scalar factor.

The light modulation unit 110 may be realized in various ways. In some embodiments, the LMU 110 may be realized by a plurality of mirrors (e.g., micromirrors) whose orientations are independently controllable. In another set of embodiments, the LMU 110 may be realized by an array of elements whose transmittances are independently controllable, e.g., as with an array of LCD shutters. An electrical control signal supplied to each element controls the extent to which light is able to transmit through the element. In yet another set of embodiments, the LMU 110 may be realized by an array of independently-controllable mechanical shutters (e.g., micromechanical shutters) that cover an array of apertures, with the shutters opening and closing in response to electrical control signals, thereby controlling the flow of light through the corresponding apertures. In yet another set of embodiments, the LMU 110 may be realized by a perforated mechanical plate, with the entire plate moving in response to electrical control signals, thereby controlling the flow of light through the corresponding perforations. In yet another set of embodiments, the LMU 110 may be realized by an array of transceiver elements, where each element receives and then immediately retransmits light in a controllable fashion. In yet another set of embodiments, the LMU 110 may be realized by a grating light valve (GLV) device. In yet another embodiment, the LMU 110 may be realized by a liquid-crystal-on-silicon (LCOS) device.

In some embodiments, the light modulating elements are arranged in an array, e.g., a two-dimensional array or a one-dimensional array. Any of various array geometries are contemplated. For example, in some embodiments, the array is a square array or rectangular array. In another embodiment, the array is hexagonal. In some embodiments, the light modulating elements are arranged in a spatially random fashion.

Let N denote the number of light modulating elements in the light modulation unit 110. In various embodiments, the number N may take a wide variety of values. For example, in different sets of embodiments, N may be, respectively, in the range [64, 256], in the range [256, 1024], in the range [1024, 4096], in the range $[2^{12},2^{14}]$, in the range $[2^{14},2^{16}]$, in the range $[2^{16},2^{18}]$, in the range $[2^{18},2^{20}]$, in the range $[2^{20},2^{22}]$, in the range $[2^{22},2^{24}]$, in the range $[2^{24},2^{26}]$, in the range from $2^{26}$ to infinity. The particular value used in any given embodiment may depend on one or more factors specific to the embodiment.

The light sensing device 130 may be configured to receive the modulated light stream MLS and to generate an analog electrical signal $I_{MLS}(t)$ representing intensity of the modulated light stream as a function of time.

The light sensing device 130 may include one or more light sensing elements. The term "light sensing element" may be interpreted as meaning "a transducer between a light signal and an electrical signal". For example, a photodiode is a light sensing element. In various other embodiments, light sensing elements might include devices such as metal-semiconductor-metal (MSM) photodetectors, phototransistors, phototubes and photomultiplier tubes.

In some embodiments, the light sensing device 130 includes one or more amplifiers (e.g., transimpedance amplifiers) to amplify the analog electrical signals generated by the one or more light sensing elements.

The ADC 140 acquires a sequence of samples $\{I_{MLS}(k)\}$ of the analog electrical signal $I_{MLS}(t)$. Each of the samples may be interpreted as an inner product between a corresponding time slice of the light stream L and a corresponding one of the spatial patterns. The set of samples $\{I_{MLS}(k)\}$ comprises an encoded representation, e.g., a compressed representation, of an image (or a video sequence) and may be used to reconstruct the image (or video sequence) based on any reconstruction algorithm known in the field of compressive sensing. (For video sequence reconstruction, the samples may be partitioned into contiguous subsets, and then the subsets may be processed to reconstruct corresponding images.)

In some embodiments, the samples $\{I_{MLS}(k)\}$ may be used for some purpose other than, or in addition to, image (or video) reconstruction. For example, system 100 (or some other system) may operate on the samples to perform an inference task, such as detecting the presence of a signal or object, identifying a signal or an object, classifying a signal or an object, estimating one or more parameters relating to a signal or an object, tracking a signal or an object, etc. In some embodiments, an object under observation by system 100 may be identified or classified by virtue of its sample set $\{I_{MLS}(k)\}$ (or parameters derived from that sample set) being similar to one of a collection of stored sample sets (or parameter sets).

In some embodiments, the light sensing device 130 includes exactly one light sensing element. (For example, the single light sensing element may be a photodiode.) The light sensing element may couple to an amplifier (e.g., a TIA) (e.g., a multi-stage amplifier).

In some embodiments, the light sensing device 130 may include a plurality of light sensing elements (e.g., photodiodes). Each light sensing element may convert light impinging on its light sensing surface into a corresponding analog electrical signal representing intensity of the impinging light as a function of time. In some embodiments, each light sensing element may couple to a corresponding amplifier so that the analog electrical signal produced by the light sensing element can be amplified prior to digitization. System 100 may be configured so that each light sensing element receives, e.g., a corresponding spatial portion (or spectral portion) of the modulated light stream.

In one embodiment, the analog electrical signals produced, respectively, by the light sensing elements may be summed to obtain a sum signal. The sum signal may then be digitized by the ADC 140 to obtain the sequence of samples $\{I_{MLS}(k)\}$. In another embodiment, the analog electrical signals may be individually digitized, each with its own ADC, to obtain corresponding sample sequences. The sample sequences may then be added to obtain the sequence $\{I_{MLS}(k)\}$. In another embodiment, the analog electrical signals produced by the light sensing elements may be sampled by a smaller number of ADCs than light sensing elements through the use of time multiplexing. For example, in one embodiment, system 100 may be configured to sample two or more of the analog electrical signals by switching the input of an ADC among the outputs of the two or more corresponding light sensing elements at a sufficiently high rate.

In some embodiments, the light sensing device 130 may include an array of light sensing elements. Arrays of any of a wide variety of sizes, configurations and material technologies are contemplated. In one embodiment, the light sensing device 130 includes a focal plane array coupled to a readout integrated circuit. In one embodiment, the light sensing device 130 may include an array of cells, where each cell includes a corresponding light sensing element and is configured to integrate and hold photo-induced charge created by the light sensing element, and to convert the integrated charge into a corresponding cell voltage. The light sensing device may also include (or couple to) circuitry configured to sample the cell voltages using one or more ADCs.

In some embodiments, the light sensing device 130 may include a plurality (or array) of light sensing elements, where each light sensing element is configured to receive a corresponding spatial portion of the modulated light stream, and each spatial portion of the modulated light stream comes from a corresponding sub-region of the array of light modulating elements. (For example, the light sensing device 130 may include a quadrant photodiode, where each quadrant of the photodiode is configured to receive modulated light from a corresponding quadrant of the array of light modulating elements. As another example, the light sensing device 130 may include a bi-cell photodiode. As yet another example, the light sensing device 130 may include a focal plane array.) Each light sensing element generates a corresponding signal representing intensity of the corresponding spatial portion as a function of time. Each signal may be digitized (e.g., by a corresponding ADC, or perhaps by a shared ADC) to obtain a corresponding sequence of samples. Thus, a plurality of sample sequences are obtained, one sample sequence per light sensing element. Each sample sequence may be processed to reconstruct a corresponding sub-image (or sub-video sequence). The sub-images may be joined together to form a whole image (or whole video sequence). The sample sequences may be captured in response to the modulation of the incident light stream with a sequence of M spatial patterns, e.g., as variously described above. By employing any of various reconstruction algorithms known in the field of compressive sensing, the number of pixels (voxels) in each reconstructed image (sub-video sequence) may be greater than (e.g., much greater than) M. To reconstruct each sub-image (sub-video), the reconstruction algorithm uses the corresponding sample sequence and the restriction of the spatial patterns to the corresponding sub-region of the array of light modulating elements.

In some embodiments, the light sensing device 130 includes a small number of light sensing elements (e.g., in respective embodiments, one, two, less than 8, less than 16, less the 32, less than 64, less than 128, less than 256). Because the light sensing device of these embodiments includes a small number of light sensing elements (e.g., far less than the typical modern CCD-based or CMOS-based camera), an entity interested in producing any of these embodiments may afford to spend more per light sensing element to realize features that are beyond the capabilities of modern array-based image sensors of large pixel count, e.g., features such as higher sensitivity, extended range of sensitivity, new range(s) of sensitivity, extended dynamic range, higher bandwidth/lower response time. Furthermore, because the light sensing device includes a small number of light sensing elements, an entity interested in producing any of these embodiments may use newer light sensing technologies (e.g., based on new materials or combinations of materials) that are not yet mature enough to be manufactured into focal plane arrays (FPA) with large pixel count. For example, new detector materials such as super-lattices, quantum dots, carbon nanotubes and graphene can significantly enhance the performance of IR detectors by reducing detector noise, increasing sensitivity, and/or decreasing detector cooling requirements.

In one embodiment, the light sensing device 130 is a thermo-electrically cooled InGaAs detector. (InGaAs stands for "Indium Gallium Arsenide".) In other embodiments, the InGaAs detector may be cooled by other mechanisms (e.g., liquid nitrogen or a Sterling engine). In yet other embodiments, the InGaAs detector may operate without cooling. In yet other embodiments, different detector materials may be used, e.g., materials such as MCT (mercury-cadmium-telluride), InSb (Indium Antimonide) and VOx (Vanadium Oxide).

In different embodiments, the light sensing device 130 may be sensitive to light at different wavelengths or wavelength ranges. In some embodiments, the light sensing device 130 may be sensitive to light over a broad range of wavelengths, e.g., over the entire visible spectrum or over the entire range $[\lambda_L, \lambda_U]$ as defined above.

In some embodiments, the light sensing device 130 may include one or more dual-sandwich photodetectors. A dual sandwich photodetector includes two photodiodes stacked (or layered) one on top of the other.

In one embodiment, the light sensing device 130 may include one or more avalanche photodiodes.

In one embodiment, the light sensing device 130 may include one or more photomultiplier tubes (PMTs).

In some embodiments, a filter may be placed in front of the light sensing device 130 to restrict the modulated light stream to a specific range of wavelengths or specific polarization. Thus, the signal $I_{MLS}(t)$ generated by the light sensing device 130 may be representative of the intensity of the restricted light stream. For example, by using a filter that passes only IR light, the light sensing device may be effectively converted into an IR detector. The sample principle may be applied to effectively convert the light sensing device into a detector for red or blue or green or UV or any desired wavelength band, or, a detector for light of a certain polarization.

In some embodiments, system 100 includes a color wheel whose rotation is synchronized with the application of the spatial patterns to the light modulation unit. As it rotates, the color wheel cyclically applies a number of optical bandpass filters to the modulated light stream MLS. Each bandpass filter restricts the modulated light stream to a corresponding sub-band of wavelengths. Thus, the samples captured by the ADC 140 will include samples of intensity in each of the sub-bands. The samples may be de-multiplexed to form separate sub-band sequences. Each sub-band sequence may be processed to generate a corresponding sub-band image. (As an example, the color wheel may include a red-pass filter, a green-pass filter and a blue-pass filter to support color imaging.)

In some embodiments, the system 100 may include a memory (or a set of memories of one or more kinds).

Figure 2B:
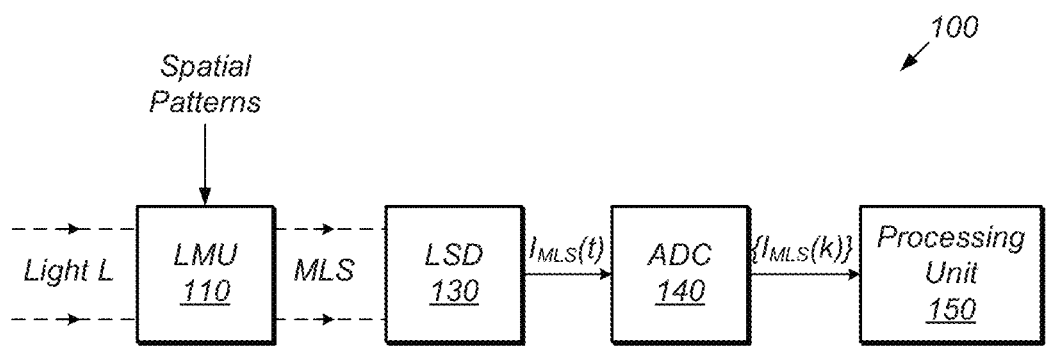
FIG. 2B illustrates an embodiment of system 100 that includes a processing unit 150.

In some embodiments, system 100 may include a processing unit 150, e.g., as shown in FIG. 2B. The processing unit 150 may be a digital circuit or a combination of digital circuits. For example, the processing unit may be a microprocessor (or system of interconnected of microprocessors), a programmable hardware element such as a field-programmable gate array (FPGA), an application specific integrated circuit (ASIC), or any combination such elements. The processing unit 150 may be configured to perform one or more functions such as image/video reconstruction, system control, user interface, statistical analysis, and one or more inferences tasks.

The system 100 (e.g., the processing unit 150) may store the samples $\{I_{MLS}(k)\}$ in a memory, e.g., a memory resident in the system 100 or in some other system.

In one embodiment, processing unit 150 is configured to operate on the samples $\{I_{MLS}(k)\}$ to generate the image or video sequence. In this embodiment, the processing unit 150 may include a microprocessor configured to execute software (i.e., program instructions), especially software for performing an image/video reconstruction algorithm. In one embodiment, system 100 is configured to transmit the compensated samples to some other system through a communication channel. (In embodiments where the spatial patterns are randomly-generated, system 100 may also transmit the random seed(s) used to generate the spatial patterns.) That other system may operate on the samples to reconstruct the image/video. System 100 may have one or more interfaces configured for sending (and perhaps also receiving) data through one or more communication channels, e.g., channels such as wireless channels, wired channels, fiber optic channels, acoustic channels, laser-based channels, etc.

In some embodiments, processing unit 150 is configured to use any of a variety of algorithms and/or any of a variety of transformations to perform image/video reconstruction. System 100 may allow a user to choose a desired algorithm and/or a desired transformation for performing the image/video reconstruction.

In some embodiments, the system 100 is configured to acquire a set $Z_M$ of samples from the ADC 140 so that the sample set $Z_M$ corresponds to M of the spatial patterns applied to the light modulation unit 110, where M is a positive integer. The number M is selected so that the sample set $Z_M$ is useable to reconstruct an n-pixel image or n-voxel video sequence that represents the incident light stream, where n is a positive integer less than or equal to the number N of light modulating elements in the light modulation unit 110. System 100 may be configured so that the number M is smaller than n. Thus, system 100 may operate as a compressive sensing device. (The number of "voxels" in a video sequence is the number of images in the video sequence times the number of pixels per image, or equivalently, the sum of the pixel counts of the images in the video sequence.)

In various embodiments, the compression ratio M/n may take any of a wide variety of values. For example, in different sets of embodiments, M/n may be, respectively, in the range [0.9,0.8], in the range [0.8,0.7], in the range [0.7,0.6], in the range [0.6,0.5], in the range [0.5,0.4], in the range [0.4,0.3], in the range [0.3,0.2], in the range [0.2,0.1], in the range [0.1, 0.05], in the range [0.05,0.01], in the range [0.001,0.01].

Superpixels for Modulation at Lower Spatial Resolution

As noted above, the image reconstructed from the sample subset $Z_M$ may be an n-pixel image with n≤N The spatial patterns may be designed to support a value of n less than N, e.g., by forcing the array of light modulating elements to operate at a lower effective resolution than the physical resolution N. For example, the spatial patterns may be designed to force each 2×2 cell of light modulating elements to act in unison. At any given time, the modulation state of the four elements in a 2×2 cell will agree. Thus, the effective resolution of the array of light modulating elements is reduced to N/4. This principle generalizes to any cell size, to cells of any shape, and to collections of cells with non-uniform cell size and/or cell shape. For example, a collection of cells of size $k_H \times k_V$, where $k_H$ and $k_V$ are positive integers, would give an effective resolution equal to $N/(k_H k_V)$. In one alternative embodiment, cells near the center of the array may have smaller sizes than cells near the periphery of the array.

The "cells" of the above discussion are referred to herein as "superpixels". When the reconstruction algorithm generates an image (video frame) from the acquired sample data, each superpixel corresponds to one pixel in the reconstructed image (video frame).

Restricting the Spatial Patterns to a Subset of the Modulation Array

Another way the spatial patterns may be arranged to support the reconstruction of an n-pixel image with n less than N is to allow the spatial patterns to vary only within a subset (or region) of the array of light modulating elements. In this mode of operation, the spatial patterns are null (take the value zero) outside the subset. (Control unit 120 may be configured to implement this restriction of the spatial patterns.) Light modulating elements corresponding to positions outside of the subset do not send any light (or send only the minimum amount of light attainable) to the light sensing device. Thus, the reconstructed image is restricted to the subset. In some embodiments, each spatial pattern (e.g., of a measurement pattern sequence) may be multiplied element-wise by a binary mask that takes the one value only in the allowed subset, and the resulting product pattern may be supplied to the light modulation unit. In some embodiments, the subset is a contiguous region of the array of light modulating elements, e.g., a rectangle or a circular disk or a hexagon. In some embodiments, the size and/or position of the region may vary (e.g., dynamically). The position of the region may vary in order to track a moving object. The size of the region may vary in order to dynamically control the rate of image acquisition or video frame rate. In some embodiments, the size of the region may be determined by user input. For example, system 100 may provide an input interface (GUI and/or mechanical control device) through which the user may vary the size of the region over a continuous range of values (or alternatively, a discrete set of values), thereby implementing a digital zoom function. Furthermore, in some embodiments, the position of the region within the field of view may be controlled by user input.

Oversampling Relative to Pattern Modulation Rate

In some embodiments, the A/D converter 140 may oversample the electrical signal generated by the light sensing device 130, i.e., acquire samples of the electrical signal at a rate higher than (e.g., a multiple of) the pattern modulation rate. The pattern modulation rate is the rate at which the spatial patterns are applied to the incident light stream L by the light modulation unit 110. Thus, the A/D converter may generate a plurality of samples per spatial pattern. The plurality of samples may be averaged to obtain a single averaged sample per spatial pattern. The averaging tends to reduce noise, and thus, to increase quality of image reconstruction. The averaging may be performed by processing unit 150 or some other processing agent. The oversampling ratio may be controlled by setting the pattern modulation rate and/or setting the A/D sampling rate.

In one embodiment, system 100 may include a light transmitter configured to generate a light beam (e.g., a laser beam), to modulate the light beam with a data signal and to transmit the modulated light beam into space or onto an optical fiber. System 100 may also include a light receiver configured to receive a modulated light beam from space or from an optical fiber, and to recover a data stream from the received modulated light beam.

In one embodiment, system 100 may be configured as a low-cost sensor system having minimal processing resources, e.g., processing resources insufficient to perform image (or video) reconstruction in user-acceptable time. In this embodiment, the system 100 may store and/or transmit the samples $\{I_{MLS}(k)\}$ so that another agent, more plentifully endowed with processing resources, may perform the image/video reconstruction based on the samples.

Figure 2C:
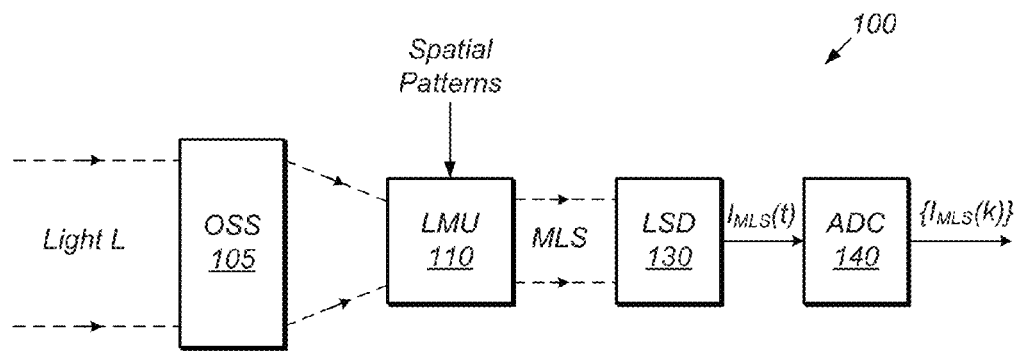
FIG. 2C illustrates an embodiment of system 100 that includes an optical subsystem 105 to focus received light L onto the light modulation unit 110.
Figure 2D:
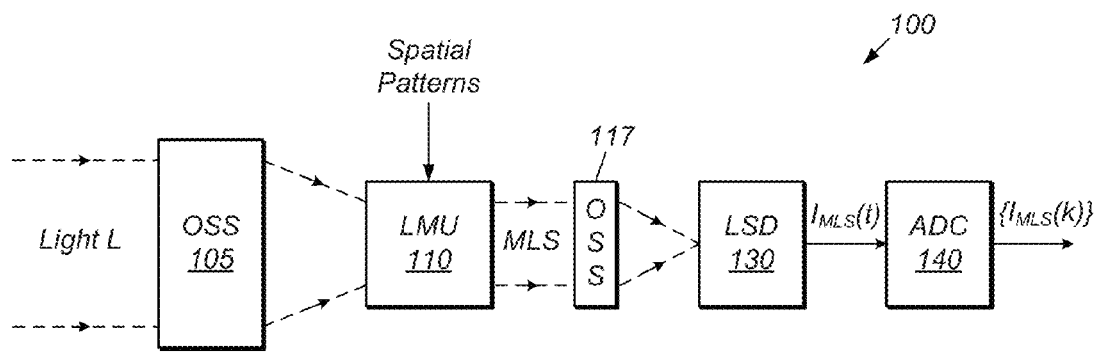
FIG. 2D illustrates an embodiment of system 100 that includes an optical subsystem 117 to direct or focus or concentrate the modulated light stream MLS onto the light sensing device 130.

In some embodiments, system 100 may include an optical subsystem 105 that is configured to modify or condition the light stream L before it arrives at the light modulation unit 110, e.g., as shown in FIG. 2C. For example, the optical subsystem 105 may be configured to receive the light stream L from the environment and to focus the light stream onto a modulating plane of the light modulation unit 110. The optical subsystem 105 may include a camera lens (or a set of lenses). The lens (or set of lenses) may be adjustable to accommodate a range of distances to external objects being imaged/sensed/captured. The optical subsystem 105 may allow manual and/or digital control of one or more parameters such as focus, zoom, shutter speed and f-stop.

In some embodiments, system 100 may include an optical subsystem 117 to direct the modulated light stream MLS onto a light sensing surface (or surfaces) of the light sensing device 130.

In some embodiments, the optical subsystem 117 may include one or more lenses, and/or, one or more mirrors.

In some embodiments, the optical subsystem 117 is configured to focus the modulated light stream onto the light sensing surface (or surfaces). The term "focus" implies an attempt to achieve the condition that rays (photons) diverging from a point on an object plane converge to a point (or an acceptably small spot) on an image plane. The term "focus" also typically implies continuity between the object plane point and the image plane point (or image plane spot); points close together on the object plane map respectively to points (or spots) close together on the image plane. In at least some of the system embodiments that include an array of light sensing elements, it may be desirable for the modulated light stream MLS to be focused onto the light sensing array so that there is continuity between points on the light modulation unit LMU and points (or spots) on the light sensing array.

In some embodiments, the optical subsystem 117 may be configured to direct the modulated light stream MLS onto the light sensing surface (or surfaces) of the light sensing device 130 in a non-focusing fashion. For example, in a system embodiment that includes only one photodiode, it may not be so important to achieve the "in focus" condition at the light sensing surface of the photodiode since positional information of photons arriving at that light sensing surface will be immediately lost.

In one embodiment, the optical subsystem 117 may be configured to receive the modulated light stream and to concentrate the modulated light stream into an area (e.g., a small area) on a light sensing surface of the light sensing device 130. Thus, the diameter of the modulated light stream may be reduced (possibly, radically reduced) in its transit from the optical subsystem 117 to the light sensing surface (or surfaces) of the light sensing device 130. For example, in some embodiments, the diameter may be reduced by a factor of more than 1.5 to 1. In other embodiments, the diameter may be reduced by a factor of more than 2 to 1. In yet other embodiments, the diameter may be reduced by a factor of more than 10 to 1. In yet other embodiments, the diameter may be reduced by factor of more than 100 to 1. In yet other embodiments, the diameter may be reduced by factor of more than 400 to 1. In one embodiment, the diameter is reduced so that the modulated light stream is concentrated onto the light sensing surface of a single light sensing element (e.g., a single photodiode).

In some embodiments, this feature of concentrating the modulated light stream onto the light sensing surface (or surfaces) of the light sensing device allows the light sensing device to sense at any given time the sum (or surface integral) of the intensities of the modulated light portions within the modulated light stream. (Each time slice of the modulated light stream comprises a spatial ensemble of modulated light portions due to the modulation unit's action of applying the corresponding spatial pattern to the light stream.)

In some embodiments, the modulated light stream MLS may be directed onto the light sensing surface of the light sensing device 130 without concentration, i.e., without decrease in diameter of the modulated light stream, e.g., by use of photodiode having a large light sensing surface, large enough to contain the cross section of the modulated light stream without the modulated light stream being concentrated.

Figure 2E:
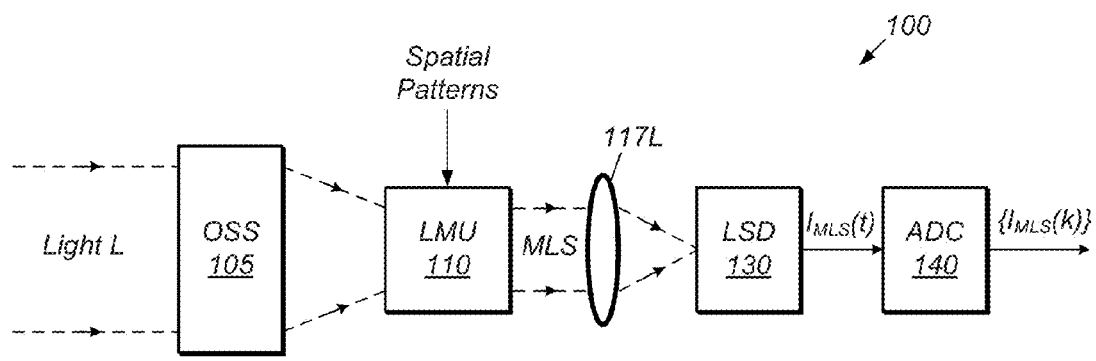
FIG. 2E illustrates an embodiment where the optical subsystem 117 is realized by a lens 117L.

In some embodiments, the optical subsystem 117 may include one or more lenses. FIG. 2E shows an embodiment where optical subsystem 117 is realized by a lens 117L, e.g., a biconvex lens or a condenser lens.

In some embodiments, the optical subsystem 117 may include one or more mirrors. In one embodiment, the optical subsystem 117 includes a parabolic mirror (or spherical mirror) to concentrate the modulated light stream onto a neighborhood (e.g., a small neighborhood) of the parabolic focal point. In this embodiment, the light sensing surface of the light sensing device may be positioned at the focal point.

In some embodiments, system 100 may include an optical mechanism (e.g., an optical mechanism including one or more prisms and/or one or more diffraction gratings) for splitting or separating the modulated light stream MLS into two or more separate streams (perhaps numerous streams), where each of the streams is confined to a different wavelength range. The separate streams may each be sensed by a separate light sensing device. (In some embodiments, the number of wavelength ranges may be, e.g., greater than 8, or greater than 16, or greater than 64, or greater than 256, or greater than 1024.) Furthermore, each separate stream may be directed (e.g., focused or concentrated) onto the corresponding light sensing device as described above in connection with optical subsystem 117. The samples captured from each light sensing device may be used to reconstruct a corresponding image (or video sequence) for the corresponding wavelength range. In one embodiment, the modulated light stream is separated into red, green and blue streams to support color (R,G,B) measurements. In another embodiment, the modulated light stream may be separated into IR, red, green, blue and UV streams to support five-channel multi-spectral imaging: (IR, R, G, B, UV). In some embodiments, the modulated light stream may be separated into a number of sub-bands (e.g., adjacent sub-bands) within the IR band to support multi-spectral or hyper-spectral IR imaging. In some embodiments, the number of IR sub-bands may be, e.g., greater than 8, or greater than 16, or greater than 64, or greater than 256, or greater than 1024. In some embodiments, the modulated light stream may experience two or more stages of spectral separation. For example, in a first stage the modulated light stream may be separated into an IR stream confined to the IR band and one or more additional streams confined to other bands. In a second stage, the IR stream may be separated into a number of sub-bands (e.g., numerous sub-bands) (e.g., adjacent sub-bands) within the IR band to support multispectral or hyper-spectral IR imaging.

In some embodiments, system 100 may include an optical mechanism (e.g., a mechanism including one or more beam splitters) for splitting or separating the modulated light stream MLS into two or more separate streams, e.g., where each of the streams have the same (or approximately the same) spectral characteristics or wavelength range. The separate streams may then pass through respective bandpass filters to obtain corresponding modified streams, where each modified stream is restricted to a corresponding band of wavelengths. Each of the modified streams may be sensed by a separate light sensing device. (In some embodiments, the number of wavelength bands may be, e.g., greater than 8, or greater than 16, or greater than 64, or greater than 256, or greater than 1024.) Furthermore, each of the modified streams may be directed (e.g., focused or concentrated) onto the corresponding light sensing device as described above in connection with optical subsystem 117. The samples captured from each light sensing device may be used to reconstruct a corresponding image (or video sequence) for the corresponding wavelength band. In one embodiment, the modulated light stream is separated into three streams which are then filtered, respectively, with a red-pass filter, a green-pass filter and a blue-pass filter. The resulting red, green and blue streams are then respectively detected by three light sensing devices to support color (R,G,B) acquisition.

In another similar embodiment, five streams are generated, filtered with five respective filters, and then measured with five respective light sensing devices to support (IR, R, G, B, UV) multi-spectral acquisition. In yet another embodiment, the modulated light stream of a given band may be separated into a number of (e.g., numerous) sub-bands to support multi-spectral or hyper-spectral imaging.

In some embodiments, system 100 may include an optical mechanism for splitting or separating the modulated light stream MLS into two or more separate streams. The separate streams may be directed to (e.g., concentrated onto) respective light sensing devices. The light sensing devices may be configured to be sensitive in different wavelength ranges, e.g., by virtue of their different material properties. Samples captured from each light sensing device may be used to reconstruct a corresponding image (or video sequence) for the corresponding wavelength range.

Figure 2F:
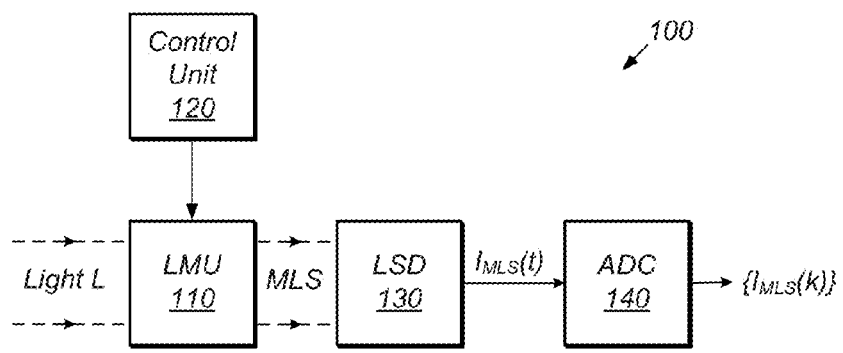
FIG. 2F illustrates an embodiment of system 100 that includes a control unit that is configured to supply a series of spatial patterns to the light modulation unit 110.

In some embodiments, system 100 may include a control unit 120 configured to supply the spatial patterns to the light modulation unit 110, as shown in FIG. 2F. The control unit may itself generate the patterns or may receive the patterns from some other agent. The control unit 120 and the ADC 140 may be controlled by a common clock signal so that ADC 140 can coordinate (synchronize) its action of capturing the samples $\{I_{MLS}(k)\}$ with the control unit's action of supplying spatial patterns to the light modulation unit 110. (System 100 may include clock generation circuitry.)

In some embodiments, the control unit 120 may supply the spatial patterns to the light modulation unit in a periodic fashion.

The control unit 120 may be a digital circuit or a combination of digital circuits. For example, the control unit may include a microprocessor (or system of interconnected of microprocessors), a programmable hardware element such as a field-programmable gate array (FPGA), an application specific integrated circuit (ASIC), or any combination such elements.

In some embodiments, the control unit 120 may include a random number generator (RNG) or a set of random number generators to generate the spatial patterns or some subset of the spatial patterns.

In some embodiments, system 100 is battery powered. In some embodiments, the system 100 includes a set of one or more solar cells and associated circuitry to derive power from sunlight.

In some embodiments, system 100 includes its own light source for illuminating the environment or a target portion of the environment.

In some embodiments, system 100 may include a display (or an interface configured for coupling to a display) for displaying reconstructed images/videos.

In some embodiments, system 100 may include one or more input devices (and/or, one or more interfaces for input devices), e.g., any combination or subset of the following devices: a set of buttons and/or knobs, a keyboard, a keypad, a mouse, a touch-sensitive pad such as a trackpad, a touch-sensitive display screen, one or more microphones, one or more temperature sensors, one or more chemical sensors, one or more pressure sensors, one or more accelerometers, one or more orientation sensors (e.g., a three-axis gyroscopic sensor), one or more proximity sensors, one or more antennas, etc.

Regarding the spatial patterns that are used to modulate the light stream L, it should be understood that there are a wide variety of possibilities. In some embodiments, the control unit 120 may be programmable so that any desired set of spatial patterns may be used.

In some embodiments, the spatial patterns are binary valued. Such an embodiment may be used, e.g., when the light modulating elements are two-state devices. In some embodiments, the spatial patterns are n-state valued, where each element of each pattern takes one of n states, where n is an integer greater than two. (Such an embodiment may be used, e.g., when the light modulating elements are each able to achieve n or more modulation states). In some embodiments, the spatial patterns are real valued, e.g., when each of the light modulating elements admits a continuous range of modulation. (It is noted that even a two-state modulating element may be made to effectively apply a continuous range of modulation by duty cycling the two states during modulation intervals.)

Coherence

The spatial patterns may belong to a set of measurement vectors that is incoherent with a set of vectors in which the image/video is approximately sparse ("the sparsity vector set"). (See "Sparse Signal Detection from Incoherent Projections", Proc. Int. Conf. Acoustics, Speech Signal Processing—ICASSP, May 2006, Duarte et al.) Given two sets of vectors A={$a_i$} and B={$b_i$} in the same N-dimensional space, A and B are said to be incoherent if their coherence measure $\mu(A,B)$ is sufficiently small. Assuming that the vectors {$a_i$} and {$b_i$} each have unit $L^2$ norm, then coherence measure may be defined as:

$$\mu(A, B) = \max_{i,j} |\langle a_i, b_j \rangle|.$$

The number of compressive sensing measurements (i.e., samples of the sequence {$I_{MLS}(k)$} needed to reconstruct an N-pixel image (or N-voxel video sequence) that accurately represents the scene being captured is a strictly increasing function of the coherence between the measurement vector set and the sparsity vector set. Thus, better compression can be achieved with smaller values of the coherence.

In some embodiments, the measurement vector set may be based on a code. Any of various codes from information theory may be used, e.g., codes such as exponentiated Kerdock codes, exponentiated Delsarte-Goethals codes, run-length limited codes, LDPC codes, Reed Solomon codes and Reed Muller codes.

In some embodiments, the measurement vector set corresponds to a randomized or permuted basis, where the basis may be, for example, the DCT basis (DCT is an acronym for Discrete Cosine Transform) or Hadamard basis.

In some embodiments, the spatial patterns may be random or pseudo-random patterns, e.g., generated according to a random number generation (RNG) algorithm using one or more seeds. In some embodiments, the elements of each pattern are generated by a series of Bernoulli trials, where each trial has a probability p of giving the value one and probability 1−p of giving the value zero. (For example, in one embodiment p=1/2.) In some embodiments, the elements of each pattern are generated by a series of draws from a Gaussian random variable.)

The system 100 may be configured to operate in a compressive fashion, where the number of the samples {$I_{MLS}(k)$} captured by the system 100 is less than (e.g., much less than) the number of pixels in the image (or video) to be reconstructed from the samples. In many applications, this compressive realization is very desirable because it saves on power consumption, memory utilization and transmission bandwidth consumption. However, non-compressive realizations are contemplated as well.

In some embodiments, the system 100 is configured as a camera or imager that captures information representing an image (or a series of images) from the external environment, e.g., an image (or a series of images) of some external object or scene. The camera system may take different forms in different application domains, e.g., domains such as visible light photography, infrared photography, ultraviolet photography, high-speed photography, low-light photography, underwater photography, multi-spectral imaging, hyper-spectral imaging, etc. In some embodiments, system 100 is configured to operate in conjunction with (or as part of) another system, e.g., in conjunction with (or as part of) a microscope, a telescope, a robot, a security system, a surveillance system, a fire sensor, a node in a distributed sensor network, etc.

In some embodiments, system 100 is configured as a spectrometer.

In some embodiments, system 100 is configured as a multi-spectral or hyper-spectral imager.

In some embodiments, system 100 may configured as a single integrated package, e.g., as a camera.

In some embodiments, system 100 may also be configured to operate as a projector. Thus, system 100 may include a light source, e.g., a light source located at or near a focal point of optical subsystem 117. In projection mode, the light modulation unit 110 may be supplied with an image (or a sequence of images), e.g., by control unit 120. The light modulation unit may receive a light beam generated by the light source, and modulate the light beam with the image (or sequence of images) to obtain a modulated light beam. The modulated light beam exits the system 100 and is displayed on a display surface (e.g., an external screen).

In one embodiment, the light modulation unit 110 may receive the light beam from the light source and modulate the light beam with a time sequence of spatial patterns (from a measurement pattern set). The resulting modulated light beam exits the system 100 and is used to illuminate the external scene. Light reflected from the external scene in response to the modulated light beam is measured by a light sensing device (e.g., a photodiode). The samples captured by the light sensing device comprise compressive measurements of external scene. Those compressive measurements may be used to reconstruct an image or video sequence as variously described above.

In some embodiments, system 100 includes an interface for communicating with a host computer. The host computer may send control information and/or program code to the system 100 via the interface. Furthermore, the host computer may receive status information and/or compressive sensing measurements from system 100 via the interface.

Figure 3A:
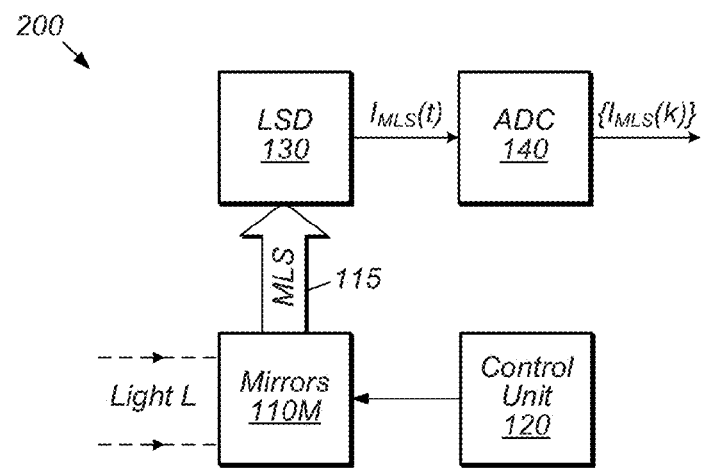
FIG. 3A illustrates system 200, where the light modulation unit 110 is realized by a plurality of mirrors (collectively referenced by label 110M).

In one realization 200 of system 100, the light modulation unit 110 may be realized by a plurality of mirrors, e.g., as shown in FIG. 3A. (The mirrors are collectively indicated by the label 110M.) The mirrors 110M are configured to receive corresponding portions of the light L received from the environment, albeit not necessarily directly from the environment. (There may be one or more optical elements, e.g., one or more lenses along the input path to the mirrors 110M.) Each of the mirrors is configured to controllably switch between at least two orientation states. In addition, each of the mirrors is configured to (a) reflect the corresponding portion of the light onto a sensing path 115 when the mirror is in a first of the two orientation states and (b) reflect the corresponding portion of the light away from the sensing path when the mirror is in a second of the two orientation states.

In some embodiments, the mirrors 110M are arranged in an array, e.g., a two-dimensional array or a one-dimensional array. Any of various array geometries are contemplated. For example, in different embodiments, the array may be a square array, a rectangular array, a hexagonal array, etc. In some embodiments, the mirrors are arranged in a spatially-random fashion.

The mirrors 110M may be part of a digital micromirror device (DMD). For example, in some embodiments, one of the DMDs manufactured by Texas Instruments may be used.

The control unit 120 may be configured to drive the orientation states of the mirrors through the series of spatial patterns, where each of the patterns of the series specifies an orientation state for each of the mirrors.

The light sensing device 130 may be configured to receive the light portions reflected at any given time onto the sensing path 115 by the subset of mirrors in the first orientation state and to generate an analog electrical signal $I_{MLS}(t)$ representing a cumulative intensity of the received light portions as function of time. As the mirrors are driven through the series of spatial patterns, the subset of mirrors in the first orientation state will vary from one spatial pattern to the next. Thus, the cumulative intensity of light portions reflected onto the sensing path 115 and arriving at the light sensing device will vary as a function time. Note that the term "cumulative" is meant to suggest a summation (spatial integration) over the light portions arriving at the light sensing device at any given time. This summation may be implemented, at least in part, optically (e.g., by means of a lens and/or mirror that concentrates or focuses the light portions onto a concentrated area as described above).

Figure 3B:
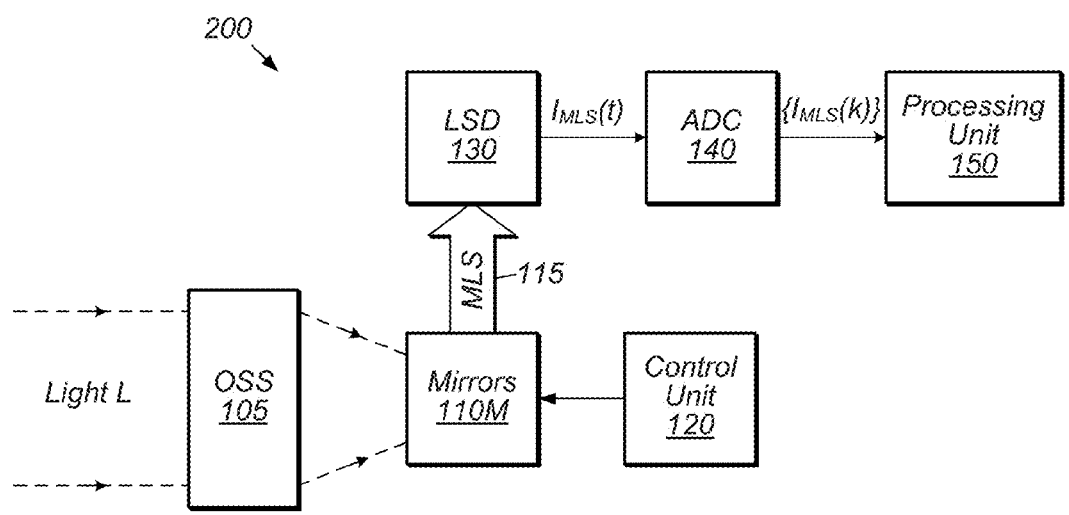
FIG. 3B shows an embodiment of system 200 that includes the processing unit 150.

System realization 200 may include any subset of the features, embodiments and elements discussed above with respect to system 100. For example, system realization 200 may include the optical subsystem 105 to operate on the incoming light L before it arrives at the mirrors 110M, e.g., as shown in FIG. 3B.

Figure 4:
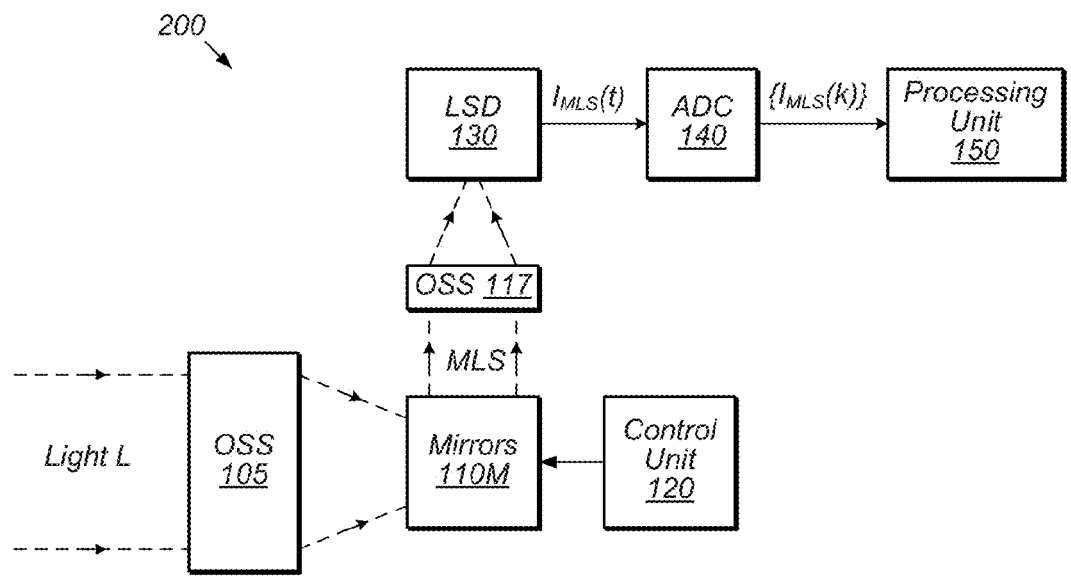
FIG. 4 shows an embodiment of system 200 that includes the optical subsystem 117 to direct or focus or concentrate the modulated light stream MLS onto the light sensing device 130.
Figure 5A:
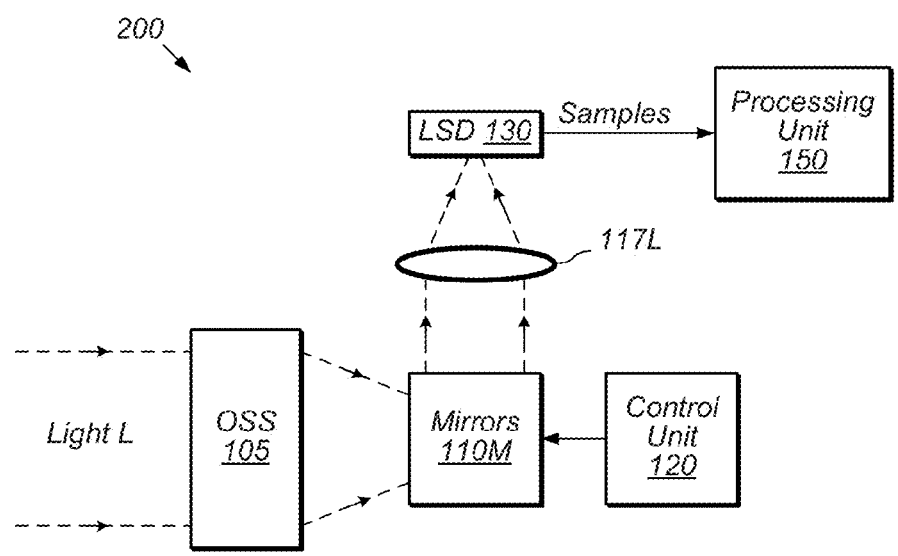
FIG. 5A shows an embodiment of system 200 where the optical subsystem 117 is realized by the lens 117L.

In some embodiments, system realization 200 may include the optical subsystem 117 along the sensing path as shown in FIG. 4. The optical subsystem 117 receives the light portions reflected onto the sensing path 115 and directs (e.g., focuses or concentrates) the received light portions onto a light sensing surface (or surfaces) of the light sensing device 130. In one embodiment, the optical subsystem 117 may include a lens 117L, e.g., as shown in FIG. 5A.

Figure 5B:
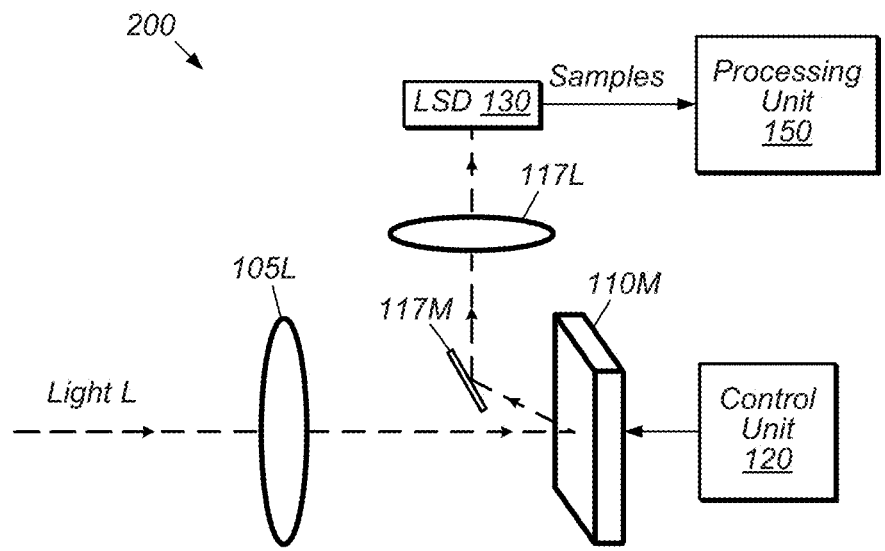
FIG. 5B shows an embodiment of system 200 where the optical subsystem 117 is realized by a mirror 117M and lens 117L in series.

In some embodiments, the optical subsystem 117 may include one or more mirrors, e.g., a mirror 117M as shown in FIG. 5B. Thus, the sensing path may be a bent path having more than one segment. FIG. 5B also shows one possible embodiment of optical subsystem 105, as a lens 105L.

Figure 5C:
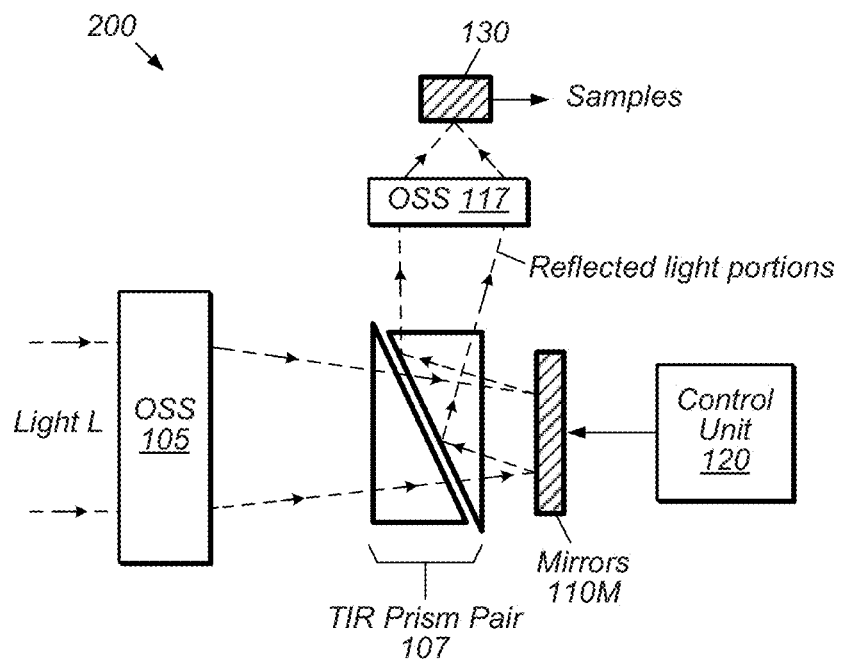
FIG. 5C shows another embodiment of system 200 that includes a TIR prism pair 107.

In some embodiments, there may be one or more optical elements intervening between the optical subsystem 105 and the mirrors 110M. For example, as shown in FIG. 5C, a TIR prism pair 107 may be positioned between the optical subsystem 105 and the mirrors 110M. (TIR is an acronym for "total internal reflection".) Light from optical subsystem 105 is transmitted through the TIR prism pair and then interacts with the mirrors 110M. After having interacted with the mirrors 110M, light portions from mirrors in the first orientation state are reflected by a second prism of the pair onto the sensing path 115. Light portions from mirrors in the second orientation state may be reflected away from the sensing path.

Overlap Patterns and Image Stitching for Multiple-Detector Compressive-Sensing Camera Optical crosstalk is an unavoidable result of dividing a field of view into multiple segments, even if those segments are adjacent but not overlapping in space. The prior approach does not take optical cross talk into account, i.e., assumes that each of the individual sensors only receives light reflected from mirrors that are within the specific sub-region dedicated to it. The new approach disclosed herein takes optical cross talk into account, i.e., assumes that light can be received from the sub-region dedicated to it as well as from at least some of the mirrors that belong to the neighboring sub-regions (e.g., mirrors that are within the boundaries of the neighboring sub-regions). The new approach involves: enlarging the "footprint" of the sub-regions into virtual sub-regions, which necessarily overlap; and determining how to overlap all of the virtual sub-regions to create a single pattern that covers the full extent of the light modulator, such that when the virtual sub-regions are viewed individually, each of the virtual sub-regions contains a useful modulation pattern that comes from a measurement basis (e.g., a Hadamard basis).

As described above in the "Description of the Related Art" Section, compressive sensing operates by projecting an image represented by the vector v onto each vector of a series of M vectors. As discussed in U.S. patent application Ser. No. 11/379,688 (published as 2006/0239336 and invented by Baraniuk et al.) and illustrated in FIG. 1, an imaging device (e.g., camera) may be configured to take advantage of the compressive sensing paradigm by using a digital micromirror device (DMD) 40.

One fundamental challenge with the imaging device of FIG. 1 is obtaining high frame rates because of sequential acquisition of the measurements (samples) from the photodiode. One strategy for increasing the frame rate is to divide the field of view into smaller areas that are sampled and reconstructed in parallel (e.g., as variously described in U.S. patent application No. U.S. patent application Ser. No. 13/197,304.) This strategy has at least two advantages useful for increasing camera operational frame rate while maintaining high resolution. The first advantage is that for each sub-aperture, the smaller pixel count requires fewer sequential measurements. The second advantage is that the smaller number of image pixels and measurements reduces processing requirements, which also contributes to frame time. Ultimately, it is the speed of the image modulation that determines the frame rate limit of a compressive sensing (CS) camera. Minimizing the number of mirror flips (or modulator state transitions) needed per reconstructed image and eliminating any latency caused by processing and data transfer times maximizes the frame rate.

Multiple-Aperture Compressive Sensing Camera Design

Following this strategy, InView has developed a multi-aperture CS camera that uses an array of photodiodes, each of which essentially act as individual but simultaneously operating single-pixel cameras. Images reconstructed from each of the photodiode measurements are stitched together to form the full field of view.

Figure 6A:
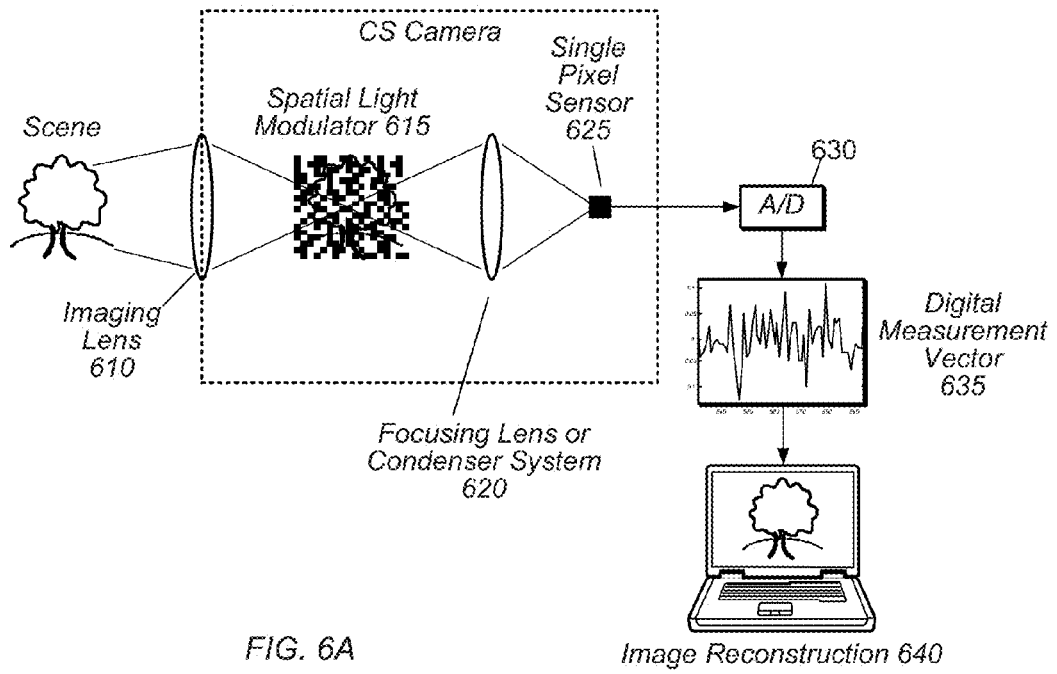
FIG. 6A is a schematic of a single-pixel camera, according to one embodiment.
Figure 6B:
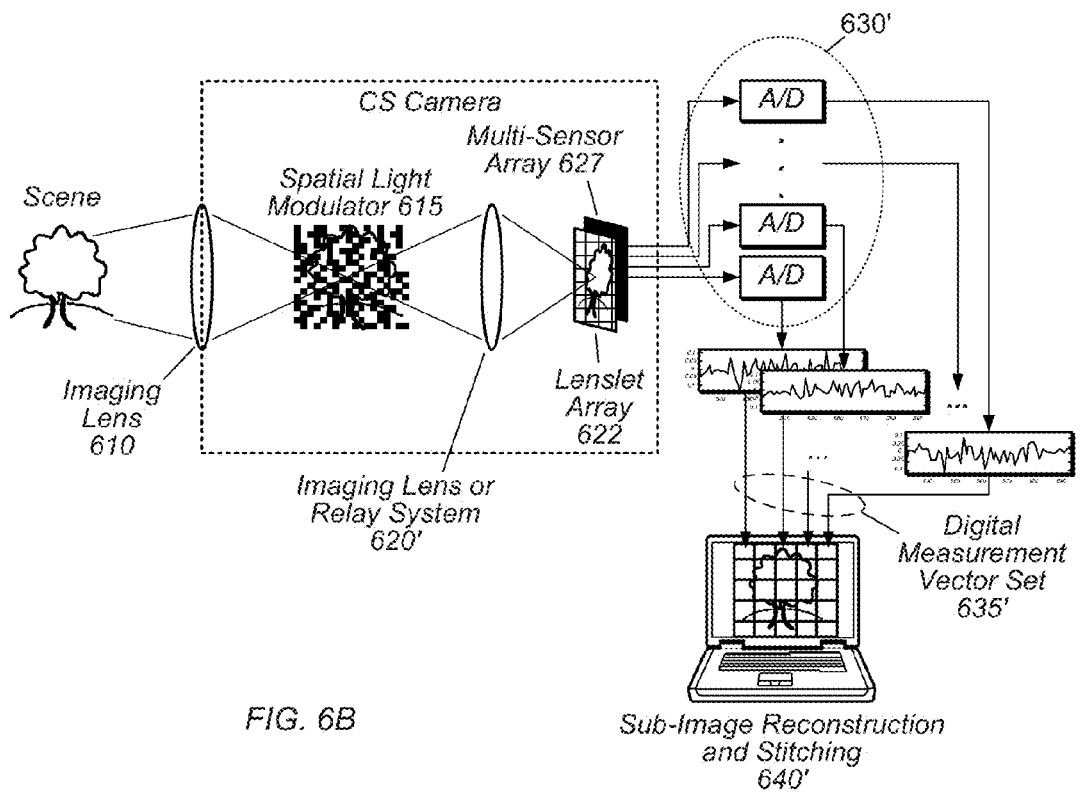
FIG. 6B is a schematic of a multiple-aperture camera, according to one embodiment.

There are a number of modifications to the single-pixel camera optics necessary to implement the multi-diode design, as schematically depicted in FIG. 6A and FIG. 6B. FIG. 6A shows the single-pixel camera. FIG. 6A shows the modified camera having an array of photodiodes.

In FIG. 6A, light from a scene is imaged by an imaging lens 610 onto the surface of a spatial light modulator 615. The spatial light modulator 615 modulates the light with spatial patterns, and the modulated light is focused by a focusing lens or condenser system 620 onto a single pixel sensor 625 (e.g., a photodiode). The signal generated by the sensor 625, which represents intensity of the modulated light, is sampled by A/D converter 630 to obtain a digital measurement vector 635. The vector is processed at 640 along with knowledge of the spatial patterns used by the modulator 615 to obtain an image. That processing is referred to as image reconstruction.

The most important change from FIG. 6A to FIG. 6B is to the optics following the modulator 615 (e.g., DMD). Rather than a condenser system, an imaging lens or relay system 620' is used to re-image the modulated scene onto a lenslet array 622. The lenslets of the lenslet array divide the modulated image into a number of sub-apertures. Each lenslet focuses the modulated light from each sub-aperture onto a corresponding detector of a multi-sensor array 627. (The array 627 may be an array of photodiodes.) Each of the sensors of the array 627 generates a respective signal representing intensity of the modulated light that it receives. Each signal is sampled by a respective A/D converter of the collection of converters 630' to obtain a respective digital measurement vector. At 640', the set 635' of the digital measurement vectors are used to reconstruct an image. In particular, each digital measurement vector is used to reconstruct a corresponding sub-image, and then, the sub-images are stitched together to form the whole image.

As an alternative to a lens system 620', we may also consider using an image transfer device such as a coherent fiber faceplate or fiber taper.

The size and shape of the lenslets of the lenslet array 622 was optimized to create the largest sub-aperture size while maintaining a surface sag that is manufacturable using ordinary multi-level photo-etching techniques.

The lenslets may be centered on a regular grid array. While this simplifies the design, it is not necessary that the lenslets be identical or regularly spaced in all embodiments. Non-uniform lenslet arrays may also be used.

In one alternative embodiment, the modulated image may fall directly on the detector array, with the detectors themselves serving to divide the image into separate segments.

In some embodiments, the spatial patterns (i.e., the modulation patterns) may be generated in a CPU and sent to the modulator 615 via a high-performance interconnect (e.g., PCI express). This allows the operator to develop and change the patterns used in the compressive-sensing data acquisition process and also provides a data path for off board reconstruction (e.g., via USB or other connectivity technology), which are useful for development and research purposes.

Spatial pattern generation and reconstruction may also be implemented in the camera.

Various additional embodiments of a multi-aperture camera are discussed in U.S. patent application Ser. No. 13/197,304.

Figure 7:
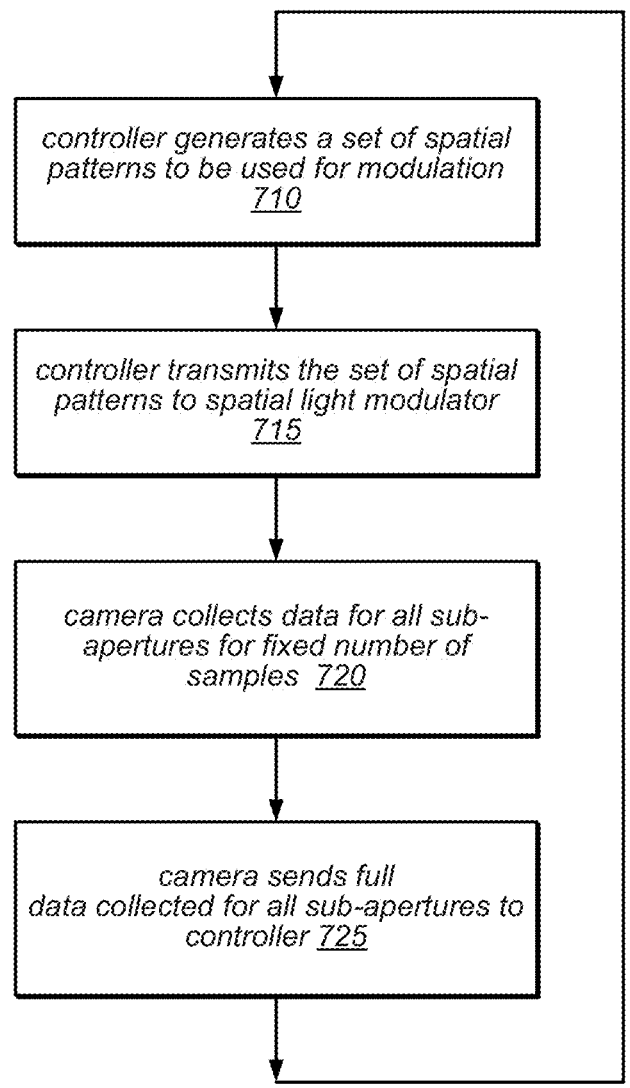
FIG. 7 illustrates one embodiment of a method for operating a multiple-aperture camera such as the camera of FIG. 6B.

FIG. 7 shows a method for operating the camera of FIG. 6B using a controller (e.g., a processing unit as variously described above).

At 710, a controller generates a set of spatial patterns to be used for modulation of the light from the scene. The patterns may be specially configured to facilitate reconstruction of the above-described sub-images corresponding to the respective sub-apertures of the camera. (Recall that each light sensor of the sensor array 627 senses modulated light from a respective sub-aperture (a respective portion of the field of view) of the whole aperture sensed by the array.

At 715, the controller transmits the set of spatial patterns to the spatial light modulator (or to the camera), e.g., using any desired interconnect technology.

At 720, the camera collects data for all sub-apertures. In some embodiments, the same number of samples may be collected from each sensor of the sensor array 627. However, in other embodiments, different numbers of samples may be collected from different sensors of the array 627, e.g., to support foveation. Certain portions of the aperture, e.g., a central portion, may be deemed to be more worthy of high quality reconstruction than other portions. Collecting a larger number of samples from sensors in the most important portions of the aperture supports higher quality sub-image reconstruction in those portions.

At 725, the camera sends the data collected for all sub-apertures to the controller for storage and/or image reconstruction. The method may continue with step 710 to start acquisition of the next image.

Overlapped Sub-Aperture Measurement Pattern Design

Ideally, the lenslets are designed so that each sub-aperture is independent of its neighbors. In reality, there is optical crosstalk between the sub-apertures. To account for this, novel modulation patterns are developed to allow neighboring sub-apertures to share energy and reconstruct sub-images that are slightly larger than the physical sub-apertures defined by the lenslets. Regions of overlap not only account for crosstalk energy that would otherwise be reconstructed as noise, but they also allow for tolerance in the alignment of the modulator to the lenslet array and tolerance to aberrations appearing in the image on the lenslets.

Consider a digital micromirror device or other spatial light modulator with individually controllable pixels arranged in a 2-dimensional array. This 2-dimensional structure can be partitioned into smaller non-overlapping sub-regions. In the multi-aperture CS camera described here, the modulator pixel array is partitioned such that each of the non-overlapping sub-regions corresponds to one of the lenslets and its corresponding detector. In this way, light that is acted upon by the $k^{th}$ sub-region on the modulator, impinges on lenslet k and is focused to detector k. The signal from detector k is measured in an appropriate way to create a CS measurement vector, which is processed digitally to form a reconstruction of the image segment that impinged on sub-aperture k. We refer to the image segments reconstructed from the respective photodiodes as sub-images.

In practice, the photons from some sub-regions of the modulator may stray across into a neighboring diode. If this optical crosstalk is not accounted for it will result in noise or even as a ghost image in the neighboring diode's sub-image. One way to interpret this is that the reconstruction algorithm must have a pixel location with which to assign energy as it reconstructs the sub-image. The algorithm working on a particular sub-image does not know that there are pixels just beyond its borders where light could have strayed in from.

To overcome this problem, we have introduced the idea of overlapping pixel patterns, where blocks of pixels outside the physically defined borders of each sub-region on the modulator are shared by neighboring sub-regions for the purposes of measurement and computation. This has the effect of effectively enlarging the area of each sub-image. The enlarged areas are referred to herein as virtual sub-regions. By creating these larger virtual sub-regions, the reconstruction algorithm now has a pixel location to place energy due to the photons that originated from the overlapping sections of the neighboring virtual sub-region. Otherwise, this energy from those stray photons would have resulted in noise.

Because these blocks of pixels are shared between neighboring virtual sub-regions, the patterns that are shown on the modulator must be carefully designed so that each virtual sub-region contains a valid measurement pattern, even as it shares blocks of pixels with all the virtual sub-regions surrounding it.

Figure 8B:
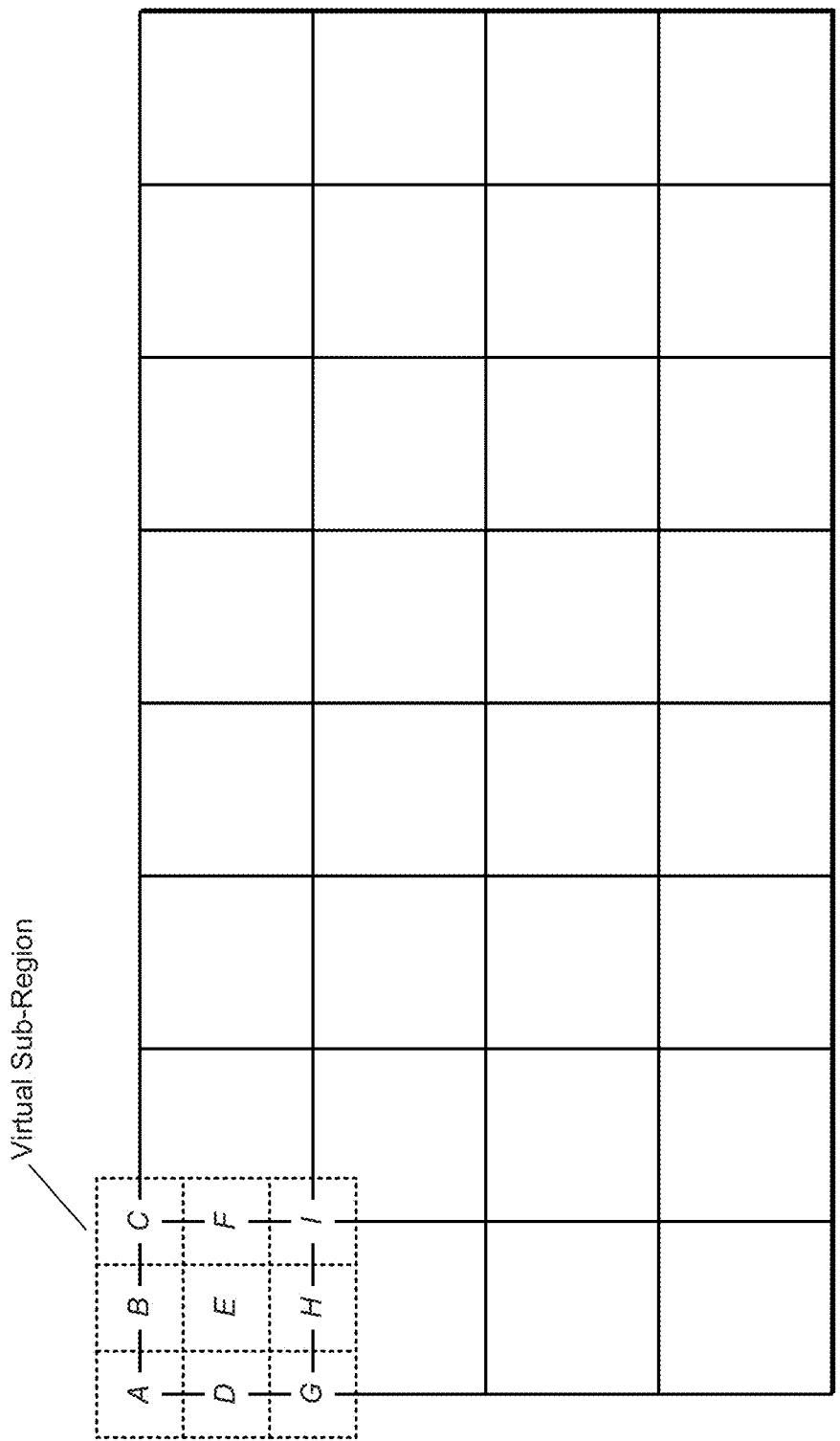
FIG. 8B illustrates an example of a virtual sub-region associated with (and including) physical sub-region number 1. The numbering of physical sub-regions is the same as in FIG. 8A.

One way of designing the modulation patterns with overlapping sub-regions is illustrated in FIGS. 8A and 8B.

In the example of FIG. 8A, the modulator is divided into 32 physically distinct sub-apertures comprising an array of 4 by 8 sub-apertures. However, it should be understood that the principles herein described naturally generalize to an array having any desired number of sub-apertures in the horizontal direction and any desired number of sub-apertures in the vertical direction.

For clarity, let us substitute some common values. Suppose that the full modulator has R rows and C columns, for a total of $N_{full}=R \times C$ pixels. Each modulator pixel will eventually correspond to a specific location in the reconstructed image. A high-definition (HD) 1080p DMD has R=1,080 rows and C=1,920 columns, with a total of $N_{full}=2,073,600$ mirrors. If we use a 4×8 array of diodes, then each of the 32 physical sub-regions will be of size (1080/4)×(1920/8)=270×240, with a total of $N_{sub}=64,800$ mirrors. Thus, each of the sub-aperture areas (numbered 1-32) shown in FIG. 8A contains 64,800 pixels within its physical boundaries.

Virtual sub-regions must be designed so that when taken together they create a physically realizable pattern on the modulator, where each physical pixel must only be required to display a single value or to be set to one state, even though neighboring virtual sub-regions share the blocks of mirrors at their boundaries.

Here we define a way of creating modulation patterns that are physically realizable while sharing blocks of pixels between neighboring virtual sub-regions of the modulator array. Although this is not the only method of defining the modulation patterns, it is a method for creating physically realizable patterns that also provides computational efficiencies during image reconstruction.

FIG. 8B shows the details of the construction of the virtual sub-region associated with the physical sub-region 1 located in the top-left corner of the modulator. The virtual sub-region is larger than its associated physical sub-region, and is divided into nine separate and non-overlapping blocks, labeled in the natural order A-I. Each of the nine blocks A-I contains a distinct modulation pattern.

To create the full modulation pattern shown on the modulator, these nine blocks are contiguously tiled over the entire modulator so that neighboring sub-regions of the modulator share (i.e., agree upon) the blocks of mirrors at their boundaries.

The result is that each virtual sub-region can be realized using one of four (4) specific permutations of these blocks of pixels, which we label with Roman numerals I-IV, seen in FIGS. 8A-8D. Permutation Type I is just the natural, non-permuted order. Permutation Type II swaps the blocks A,D,G with C,F,I, while Type III swaps blocks A,B,C with G,H,I. Permutation Type IV is generated by the Type II swap combined with the Type III swap.

Figure 10:
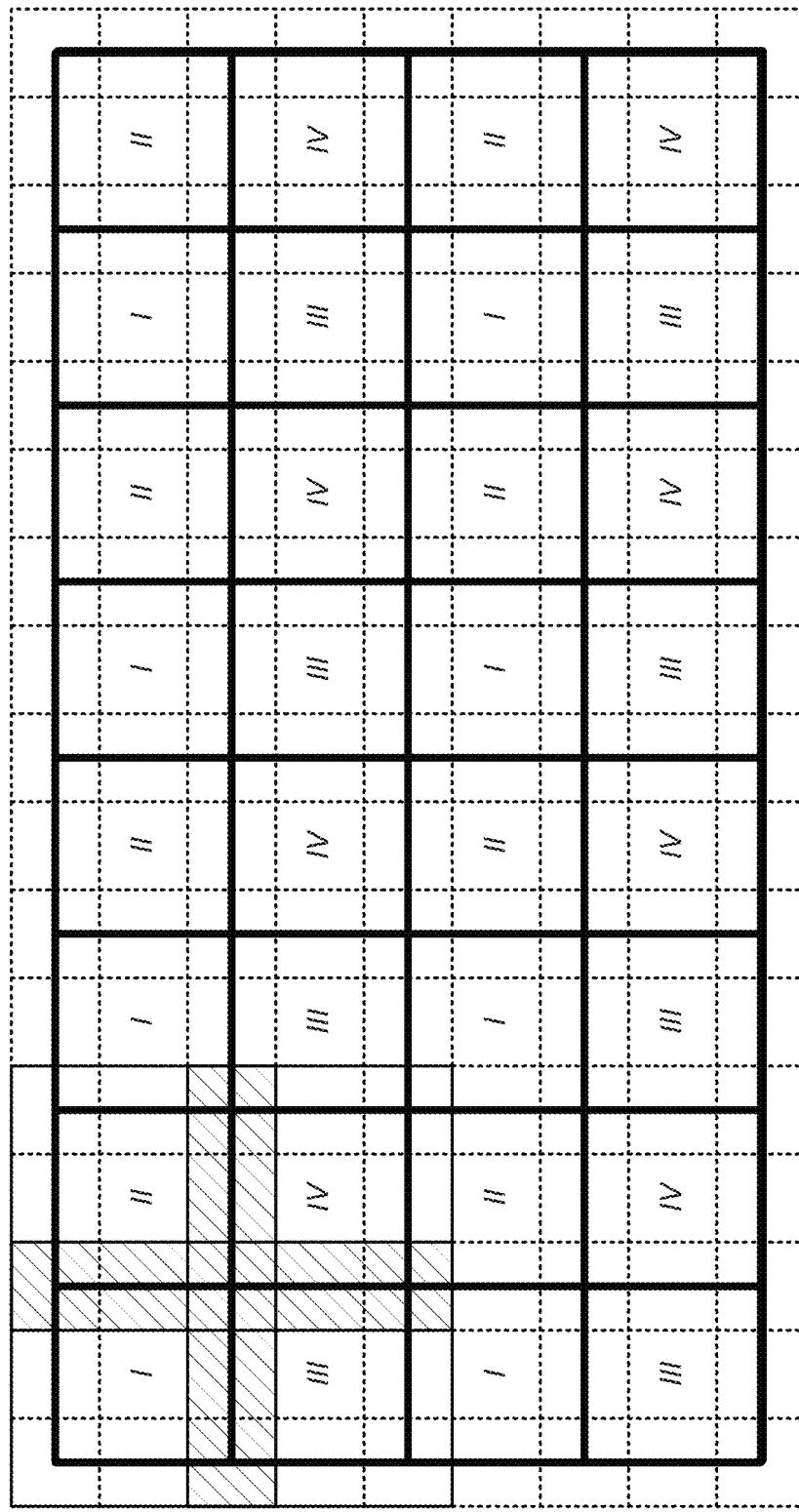
FIG. 10 illustrates the 32 virtual sub-regions and corresponding permutation types. Each virtual sub-region is a proper superset of the respective physical sub-region. Dotted lines show the nine blocks associated with each virtual sub-region. Cross hatch shows the overlap in virtual blocks associated with four virtual sub-regions in the upper left corner.

Each virtual sub-region constructed from one of these four permutations (I-IV) of nine pixel-blocks (A-I) can be associated with a respective one of the physical sub-regions defined on the modulator, as shown in the example pattern of FIG. 10, where the boundaries of the 32 physical sub-regions of the modulator are demarcated by the heavy solid lines.

TABLE 1

The 32 Sensor Sub-Regions and their corresponding Permutation Types.

| Sensor/Virtual Sub-Region No. | Block Permutation |
|---|---|
| 1, 3, 5, 7, 17, 19, 21, 23 | Type I |
| 2, 4, 6, 8, 18, 20, 22, 24 | Type II |
| 9, 11, 13, 15, 25, 27, 29, 31 | Type III |
| 10, 12, 14, 16, 26, 28, 30, 32 | Type IV |

Figure 11:
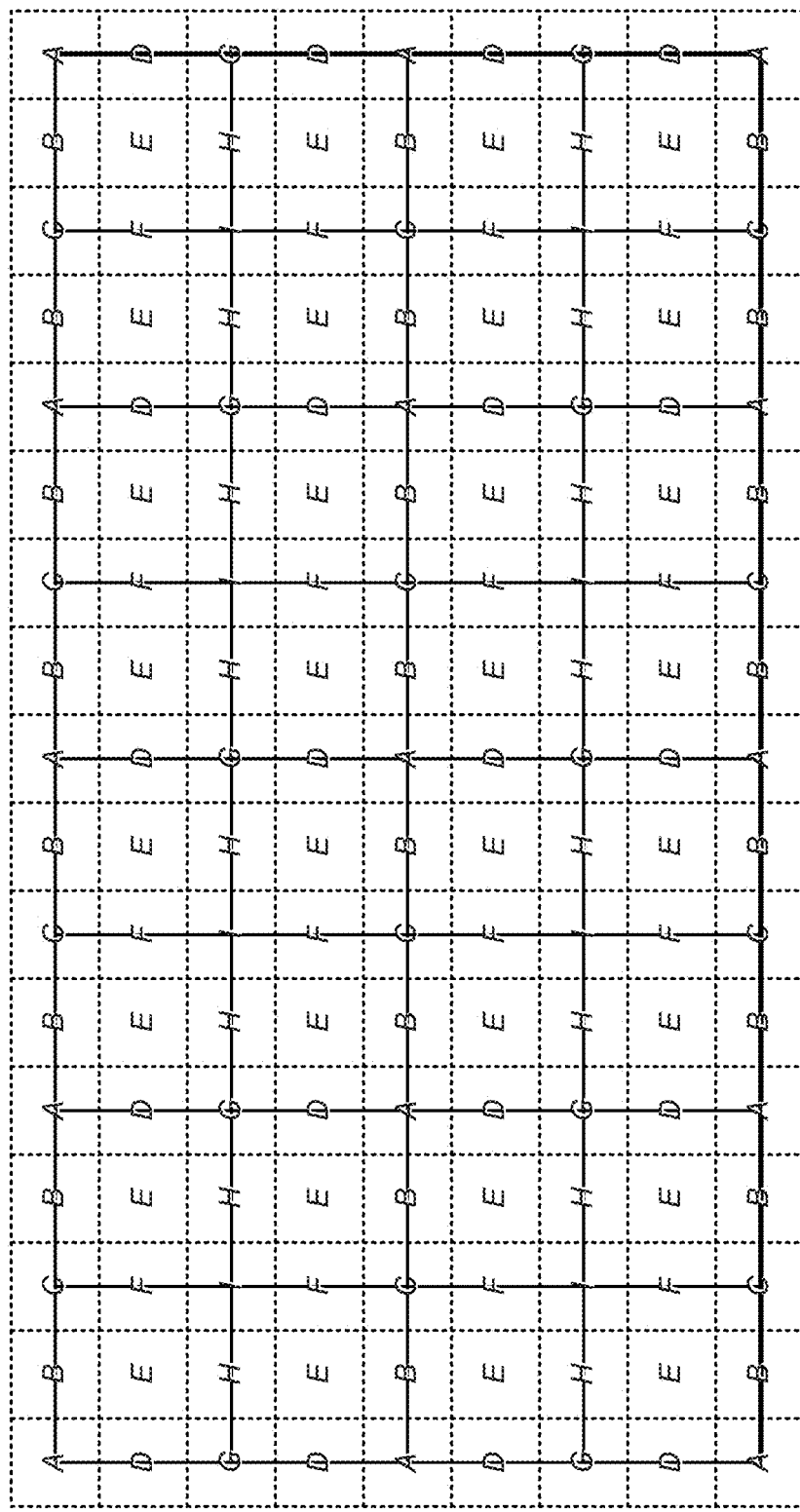
FIG. 11 illustrates the nine blocks A-I contiguously tiled on the DMD.

For this example, Table 1 and FIG. 10 show which permutation type each virtual sub-region and corresponding sensor is assigned. In this example, the first row of virtual sub-regions (i.e., sub-regions 1-8) alternates between the Type 1 permutation and the Type II permutation. (For the definition of sub-region numbers, see FIG. 8A.) The second row (i.e., sub-regions 9-16) alternates between the Type III permutation and the Type IV permutation, and so on. The breakdown of how the blocks A-I are tiled within this alternating structure can be seen in FIG. 11. Notice that all virtual sub-regions have the common Block E in their centers. To see how a particular permutation manifests, let us consider for example, the vertical boundary line that separates physical sub-regions 1 and 2. Notice that blocks C,F,I are shared by both virtual sub-regions 1 and 2. Similarly, the boundary that separates physical sub-regions 2 and 3 shows that blocks A,D,G are shared by both virtual sub-regions 2 and 3. Therefore, Sensor 2 receives light reflected from virtual sub-region 2, which is of Type II: the version that swaps blocks A,D,G with C,F,I. A similar discussion explains how the block permutations of Type III and Type IV are derived.

The Effect of Block Permutations

The previous sections explained the reasons for introducing the overlapped virtual sub-regions. In this section we describe how the design of the virtual sub-regions impacts the reconstruction algorithm. Fast transforms are attractive in computational imaging since they have implementations that can be easily executed on a computer. Hence, while in general, pixel patterns associated with the virtual sub-region blocks can be any patterns satisfying the incoherent constraint, the object here is to design a pattern that has a fast transform.

Assume that virtual sub-region 1 has a particular pattern assigned to it. Suppose, for example, that it is defined by an arbitrary row of a matrix, which represents a fast transform (e.g., Hadamard, Fourier, Noiselet, etc.) However, the way in which the 1-dimensional row vector is wrapped around the 2-dimensional virtual sub-region is preferably the same for all regions. The complication arises in the regions that have permuted blocks since it means that the corresponding parts of the row vector must also be permuted. This block permutation must be accounted for in the reconstruction algorithm that uses the measurements taken from the virtual modulation patterns. Typically, the fast transforms mentioned above are not designed to accommodate these permutations, so extra modifications to the algorithm must be done.

Algorithmic Efficiencies

It is not necessary that the overlapped virtual sub-regions be implemented efficiently as fast transforms in either the measurement or reconstruction domains. Each aperture may be measured and reconstructed without regard to permutations and other relationships between blocks. However, such naive implementations are likely to be computationally slow due to the fact that the use of fast transforms may not necessarily be possible. Advantage may be taken of how the block permutation can be implemented on so that fast transforms may be performed on each of the four block Types.

In the current example, fast transforms can be applied to Type I blocks, while Type II, III and IV blocks are permutations of Type I. Therefore, the sub-image for any of the block Types may be efficiently reconstructed as Type I while permutations within the algorithm place the sub-image components in the correct position for Types II, III and IV.

Permutations can be implemented in a number of ways depending on the reconstruction algorithm. Permutations may be applied in the measurement domain where columns of the measurement matrix are permuted. Permutation in the measurement domain is suitable for software implementation.

Reconstruction algorithms of total variation (TV) type may employ a gradient operator. In this case, the definition of the gradient operator allows permutations to be applied at the gradient operation, which may be a more suitable implementation for FPGAs.

Parallel Reconstruction

The sequences of measurements from each detector are reconstructed individually. This allows a high level of parallelism in the reconstruction process including the application of a separate processing unit for each detector or a multiplexed set of processors for optimized reconstruction speed.

Relationships in the spatial or temporal information present among the sub-apertures may also be utilized to enhance data acquisition and reconstruction procedures for improved acquisition and reconstruction speed, efficiency and image quality.

Sub-Image Stitching

Separate sub-images are reconstructed from respective CS measurement sets taken from respective light sensors, each sub-image being based on a respective one of the overlapping virtual sub-regions of the modulator.

Because of the overlap in the shared pixel blocks of these virtual sub-regions, each sub-image has portions in common with its neighboring sub-images. That is, each pair of neighboring sensors receives light from the blocks of modulator pixels that they share. Therefore, to stitch sub-apertures together to form the complete field of view, we may align the sub-images so that they overlap in the same fashion as the virtual sub-regions, i.e., with the overlap between sub-images corresponding to the shared blocks of mirrors. In this way, conservation of energy is maintained, because a particular photon in the scene can only be observed by one sensor. After overlapping the sub-images in this fashion, we create a superposition that adds back together the energy in the original scene, e.g., by adding the sub-images to form the whole image. An image pixel in an overlap between two or more sub-images will be a sum of pixel values contributed respectively by the two or more sub-images. An image pixel in the un-shared interior of a sub-image will be equal to the corresponding pixel of that sub-image.

In one embodiment, the amount of overlap used in the measurement patterns can be set to any desired amount and sub-aperture measurement patterns can be designed and implemented accordingly.

Figure 12:
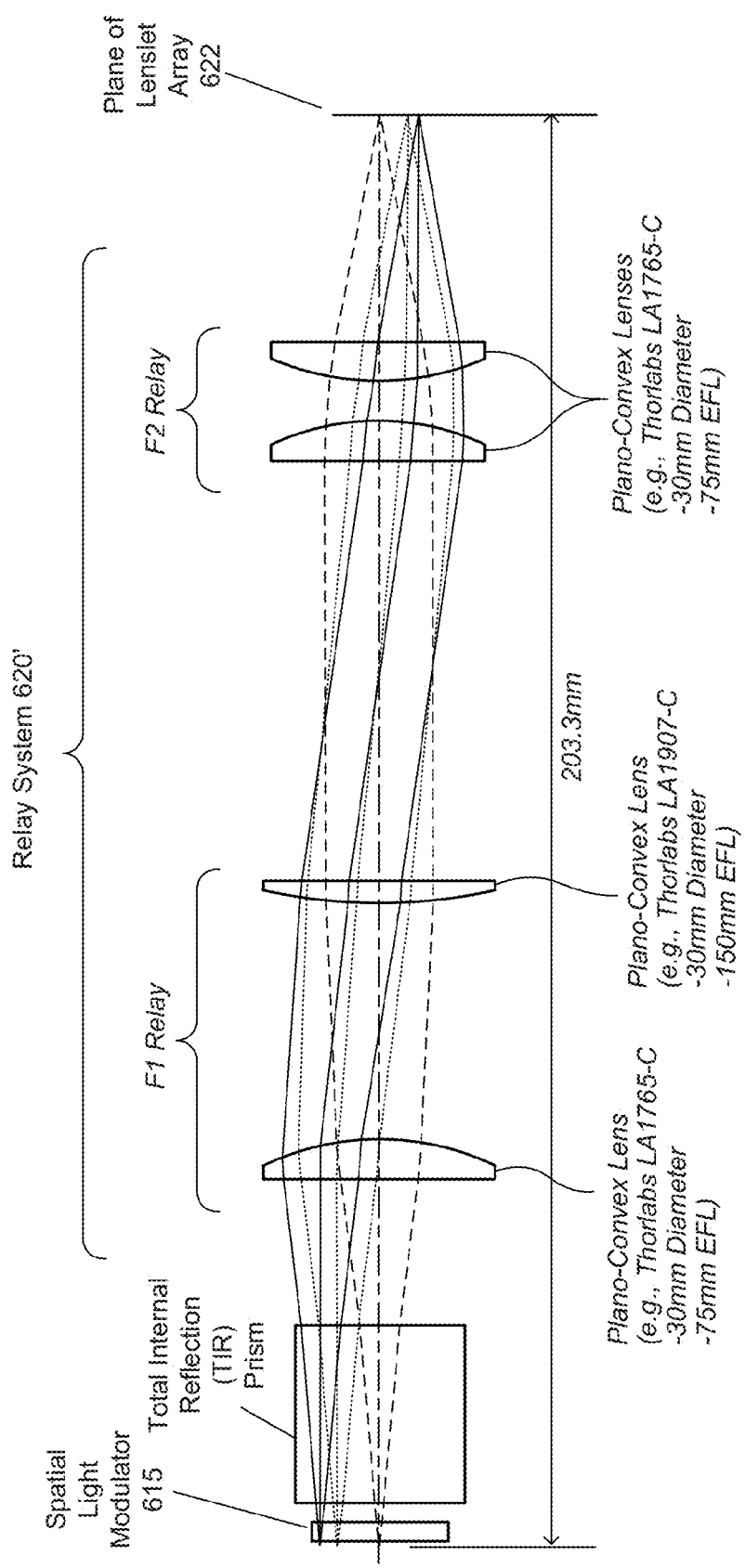
FIG. 12 illustrates an optical model of one embodiment of an image relay system that re-images light from the plane of the modulator, e.g., on the surface of the lenslet array.
Figure 13:
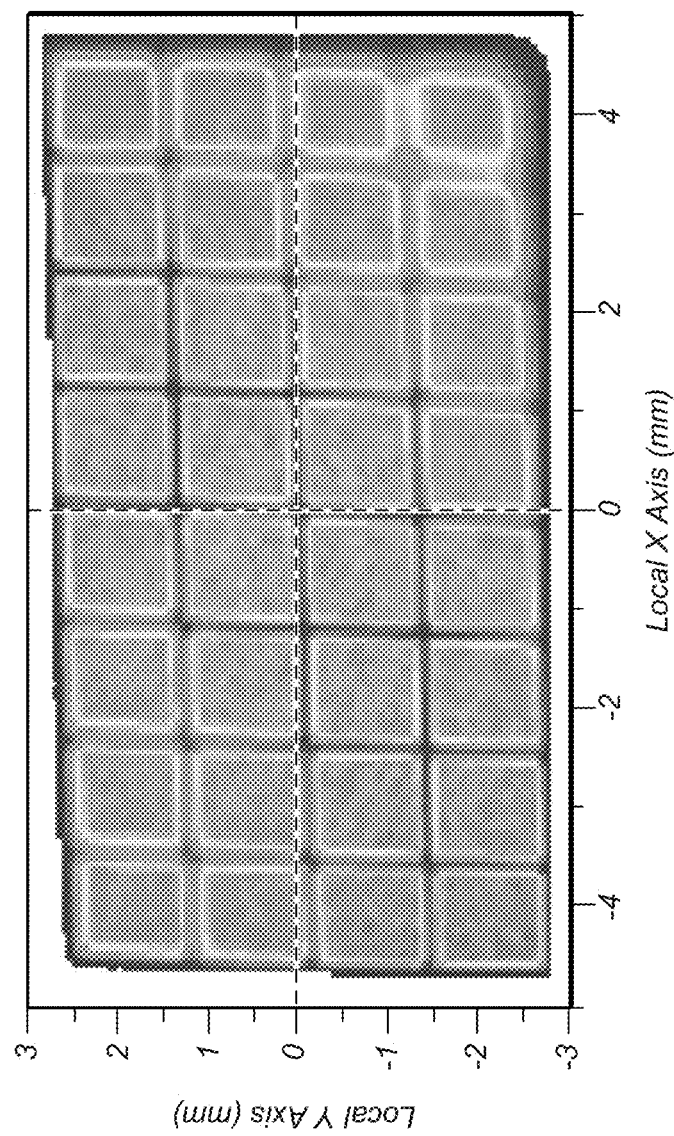
FIG. 13 illustrates a sub-aperture energy transfer simulation showing that most energy transfer between sub-apertures (i.e., crosstalk) occurs near the sub-aperture boundaries. Distortion in the image appears to be mostly due to the tilted imaging geometry of the DMD.

In another embodiment, the amount of overlap can also be determined by system modeling. In this way, both crosstalk and image distortion created by system aberrations can be accounted for in the overlap. For example, using an optical model of the image relay system 620', of which FIG. 12 is one example, we find that the sub-apertures (i.e., the physical sub-regions of the modulator) display crosstalk as well as image distortion, as seen in FIG. 13. We see that most of the energy transfer between sub-apertures occurs at the sub-aperture boundaries. Crosstalk at the boundaries is implemented in the sub-aperture overlap schemes as already described.

Optical models have also revealed that there is distortion in the relayed image caused by the optical geometry of the modulator and relay system, as shown in FIG. 12. This distortion manifests mainly as an image plane that is tilted with respect to the optical axis of the relay system. The sub-aperture overlap patterns can be used to account for this distortion in the measurement matrix by creating virtual sub-apertures (i.e., virtual sub-regions of the modulator) large enough to encompass the trapezoidally shaped images of the rectangular physical sub-regions defined on the modulator.

In another embodiment, we may account for this distortion by means of the physical arrangement of the lenslet array 622 rather than in the definition of the virtual sub-apertures. We may consider lenslet array design alternatives that can take into account distortions in the relayed image that are particular to the image relay system geometry. Differences in lenslet size, shape and position within the array may be beneficial in reducing the effects of distortion. Also, tilting the lenslet array along an axis located within the image plane and at 45 degrees through the center of the image may reduce distortion.

Figure 14:
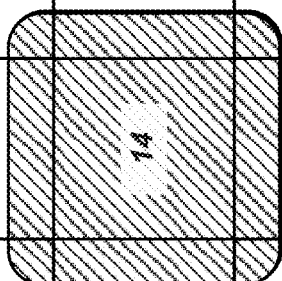
FIG. 14 illustrates of sub-aperture mapping for determining the number and/or spatial extent of shared pixels between neighboring sub-regions in the multi-aperture CS camera. Here, data from sub-region 14 is used to reconstruct the entire image field. Most of the energy maps to the 14th sub-region but also shows that energy is mapped into eight neighboring sub-regions.

In yet another embodiment, the explicit mapping of which mirrors provide optical energy to which detectors is performed experimentally by reconstructing an image of the full field of the modulator from measurements taken at each individual diode, as seen in FIG. 14. The experimental determination of overlap requirements proceeds by presenting full-field CS patterns to the entire modulator. Full-field patterns are patterns that utilize all of the modulator pixels and would be useful in a single-pixel camera. As the full-field patterns are displayed, measurements are taken at each diode of the array. These measurements are used to reconstruct the full field of view as seen by each individual sub-aperture. This procedure results in a group of full-sized images where the reconstructed energy is concentrated in the sub-aperture belonging to the corresponding detector and the remaining part of the image is black.

The illuminated pixels in these images define the modulator pixels that contribute light to each associated detector. From this pixel mapping the energy footprint of each sub-aperture can be determined and the virtual sub-region that encompasses this energy can be defined. This information can be used to determine how much crosstalk there is between sub-apertures, measure the profile of the energy over the sub-aperture boundaries, and provide a direct determination of how many pixels of overlap may be necessary in the measurement patterns to account for crosstalk.

Overlap patterns may be customized to be different for each sub-aperture to take into account the experimental mappings. While much more complicated to implement in the measurement patterns applied to the modulator, applying the measured overlap profiles will account for nearly 100% of the energy distributed within the full field image even when there are differences in overlap among sub-apertures due to optical distortion, manufacturing errors and alignment tolerances over the full field, loss at lenslet boundaries and noise.

Alternatively, overlap patterns may be designed to be the same for each sub-aperture where the amount of overlap and its profile of energy decline with distance from the physical sub-aperture profile take on assumed values. Simpler to implement, this method may lead to errors that make the boundaries between sub-apertures much more noticeable when the image is stitched together, as shown in FIG. 15.

Imperfections in the experimental system, such as vignetting, optical distortions, and misalignment, may produce imperfections in sub-aperture stitching results when the sub-aperture overlap regions are simply aligned and added together. Other techniques for combining sub-apertures already exist and may be used to improve the stitching results. For instance, gradient domain stitching is widely used in traditional image processing when a group of images is used to create a panoramic scene. Gradient domain stitching consists of forcing the gradient across the overlap regions of the sub-images to be zero in both the horizontal and vertical directions.

Pre-processing of the sub-aperture reconstructions prior to their combination by stitching can lead to further improvements in image quality. As an example, region-weighting auto-vignetting correction algorithms can be applied to each sub-image prior to stitching to correct for vignetting, where energy is lost at the sub-aperture boundaries due to lenslet edges or other factors. Additional processing algorithms may be applied.

In one set of embodiments, a method 1500 for reconstructing an image using an imaging device may involve the operations shown in FIG. 15. (The method 1500 may also include any subset of the features, elements and embodiments described above.) The imaging device may include a light modulation unit and an array of light sensing elements, e.g., as variously described above. The light modulation unit includes an array of light modulating elements. The light modulation unit modulates an incident light stream with a temporal sequence of spatial patterns. Each of the light sensing elements receives modulated light predominantly from a respective one of an array of physical sub-regions of the light modulation unit but to a lesser degree from adjacent ones of the physical sub-regions due to optical crosstalk. Each of the light sensing elements generates a corresponding set of samples representing intensity over time of the modulated light that it receives.

At 1510, the method reconstructs sub-images of the image corresponding respectively to virtual sub-regions of the light modulation unit. Each of the virtual sub-regions is a proper superset of a respective one of the physical sub-regions. (X is a said to be proper superset of Y whenever X includes more than the contents of Y, i.e., whenever X is superset of Y and is not equal to Y.) Each adjacent pair of the virtual sub-regions overlap. Furthermore, each sub-image corresponds to a respective one of the light sensing elements and is reconstructed using: (a) a respective one of the sample sets and (b) a restriction of the spatial patterns to the corresponding virtual sub-region of the light modulation unit. The action of reconstructing the sub-images may be performed by a processing unit, e.g., as variously described above.

The reconstruction of each sub-image may be performed using any image reconstruction algorithm known in the field of compressive sensing (also referred to as compressed sensing).

In some embodiments, the spatial patterns are configured so that, for each of the virtual sub-regions, the restriction of the spatial patterns to the virtual sub-region forms an incoherent measurement pattern set on the virtual sub-region, i.e., incoherent relative to a pattern set in which the image is sparse.

In some embodiments, each of the virtual sub-regions is a rectangular sub-region with common horizontal length and common vertical length, wherein each of the spatial patterns is configured so that restrictions of the spatial pattern to the respective virtual sub-regions are each composed of a common set of distinct pixel blocks.

In some embodiments, for each adjacent pair of the restrictions, a first of the restrictions has a first arrangement of the pixel blocks and a second of the restrictions has a second arrangement of the pixel blocks, wherein the first arrangement and the second arrangement are different but agree on the area of overlap between the first restriction and the second restriction.

In some embodiments, for each vertically adjacent pair of the restrictions, a first of the restrictions has a first arrangement of the pixel blocks and a second of the restrictions has a second arrangement of the pixel blocks, wherein the first arrangement and the second arrangement are related by reflection of positions of the pixel blocks relative to a horizontal axis.

In some embodiments, for each horizontally adjacent pair of the restrictions, a first of the restrictions has a first arrangement of the pixel blocks and a second of the restrictions has a second arrangement of the pixel blocks, wherein the first arrangement and the second arrangement are related by reflection of positions of the pixel blocks relative to a vertical axis.

In some embodiments, the number $N_{sub}$ of light modulating elements in each of the virtual sub-regions is the same, wherein the number of the spatial patterns is less than or equal to the number $N_{sub}$.

In some embodiments, the method 1500 also includes: generating each of the spatial patterns by: (a) selecting a basic pattern of distinct pixel blocks to cover a first of the virtual sub-regions; and (b) for each of the remaining virtual sub-regions, generating a permuted version of the basic pattern based on a respective permutation on positions of the pixel blocks within the basic pattern. The action of generating each spatial pattern may be performed by the above-described processing unit or by a separate processing unit.

In some embodiments, the permutation for each of the remaining virtual sub-regions is selected from a set including the identity map, horizontal reflection and vertical reflection.

For any given spatial pattern, each pair of permuted versions corresponding to adjacent ones of the virtual sub-regions may be generated using different permutations from the set of permutations.

In some embodiments, each of the virtual sub-regions is a rectangle of the same size. In one of these embodiments, the method 1500 also includes generating each of the spatial patterns by: (a) selecting a basic pattern of pixel blocks, wherein the basic pattern is a proper superset of a first of the virtual sub-regions; and (b) spatially repeating the basic pattern in both the vertical and horizontal directions.

In some embodiments, for each light sensing element, the corresponding virtual sub-region includes at least the set of light modulating elements from which the light sensing element receives modulated light.

In some embodiments, the method 1500 may also include combining the sub-images to form the image, e.g., as variously described above. The action of combining the sub-images may be performed by the above-described processing unit or a separate processing unit.

In some embodiments, the method 1500 may also include displaying the image using a display device.

In one set of embodiments, a system 1600 for acquiring image measurement data and reconstructing an image from the data may be configured as shown in FIG. 16. The system 1600 may include an imaging device 1610 and a processing unit 1630. (Furthermore, the system 1600 may include any subset of the features, elements and embodiments described above.)

The imaging device 1610 may include a light modulation unit 1615 and a plurality of light sensing elements 1620, e.g., as variously described above. The light modulation unit 1615 may be configured to modulate an incident stream of light L with a temporal sequence of spatial patterns to obtain a modulated light stream MLS. The incident light stream L carries an image determined by the external scene. (The spatial patterns are preferably incoherent with respect to a sparsity pattern set in which the image is sparse.) Each of the light sensing elements may be configured to receive modulated light predominantly from a respective one of an array (or simply, a plurality) of physical sub-regions of the light modulation unit but to a lesser degree from adjacent ones of the physical sub-regions due to optical crosstalk. Each of the light sensing elements may be configured to generate a corresponding set of samples representing intensity over time of the modulated light that it receives.

The processing unit 1620 may be configured to generate the spatial patterns and to reconstruct an image based on the sample sets generated by the light sensing elements. The spatial patterns and the reconstruction process account for the optical crosstalk between the physical sub-regions, e.g., as variously described above.

In some embodiments, the light sensing elements are arranged in an array, e.g., a rectangular array, a hexagonal array, a linear array, etc.

In some embodiments, the processing unit may be configured to display the reconstructed image using (or on) a display device.

In some embodiments, the number of samples in each sample set is smaller than the number of light modulating elements in the corresponding physical sub-region of the array.

In some embodiments, the action of reconstructing the image may include reconstructing sub-images of the image corresponding respectively to virtual sub-regions of the light modulation unit, where each of the virtual sub-regions is a proper superset of a respective one of the physical sub-regions, and where each adjacent pair of the virtual sub-regions overlap. Each sub-image corresponds to a respective one of the light sensing elements and is reconstructed using: (a) a respective one of the sample sets and (b) a restriction of the spatial patterns to the corresponding virtual sub-region of the light modulation unit.

In one set of embodiments, the $k^{th}$ sub-image among the sub-images is defined on the $k^{th}$ virtual sub-region, and is reconstructed based on the samples $\{S_k(i): i=1, 2, \ldots, M\}$ from the $k^{th}$ light sensing element and spatial patterns $\{P_k(i): i=1, 2, \ldots, M\}$ defined on the $k^{th}$ virtual sub-region. The spatial patterns $\{P_k(i): i=1, 2, \ldots, M\}$ are preferably incoherent with respect to the sparsity basis of the $k^{th}$ sub-image. Furthermore, for any $k_1$ and $k_2$ such that the virtual sub-region $k_1$ and virtual sub-region $k_2$ overlap, the spatial patterns $P_{k1}(i)$ and $P_{k2}(i)$ agree on the area of overlap for all $i=1, 2, \ldots, M$. (Method for generated spatial patterns for each virtual sub-regions in order to satisfy this overlap constraint have been discussed above.) Thus, for all i the spatial patterns $\{P_1(i), P_2(i), \ldots, P_K(i)\}$ may be combined to form a well defined spatial pattern P(i) on the whole array of light modulating elements, where K is the total number of virtual sub-regions.

Any of the various embodiments described herein may be combined to form composite embodiments. Furthermore, any of the various features, embodiments and elements described in U.S. Provisional Application No. 61/737,401 may be combined with any of the various embodiments described herein.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for reconstructing an image using an imaging device, wherein the imaging device includes a light modulation unit and an array of light sensing elements, wherein the light modulation unit includes an array of light modulating elements, wherein the light modulation unit modulates an incident light stream with a temporal sequence of spatial patterns, wherein each of the light sensing elements receives modulated light predominantly from a respective one of an array of physical sub-regions of the light modulation unit but to a lesser degree from adjacent ones of the physical sub-regions due to optical crosstalk, wherein each of the light sensing elements generates a corresponding set of samples representing intensity over time of the modulated light that it receives, the method comprising:

reconstructing sub-images of the image corresponding respectively to virtual sub-regions of the light modulation unit, wherein each of the virtual sub-regions is a proper superset of a respective one of the physical sub-regions, wherein each adjacent pair of the virtual sub-regions overlap, wherein each sub-image corresponds to a respective one of the light sensing elements and is reconstructed using: (a) a respective one of the sample sets and (b) a restriction of the spatial patterns to the corresponding virtual sub-region of the light modulation unit, wherein said reconstructing is performed by a processing unit.

2. The method of claim 1, wherein, the spatial patterns are configured so that, for each of the virtual sub-regions, the restriction of the spatial patterns to the virtual sub-region forms an incoherent measurement pattern set on the virtual sub-region.

3. The method of claim 1, wherein each of the virtual sub-regions is a rectangular sub-region with common horizontal length and common vertical length, wherein each of the spatial patterns is configured so that restrictions of the spatial pattern to the respective virtual sub-regions are each composed of a common set of distinct pixel blocks.

4. The method of claim 3, wherein, for each adjacent pair of the restrictions, a first of the restrictions has a first arrangement of the pixel blocks and a second of the restrictions has a second arrangement of the pixel blocks, wherein the first arrangement and the second arrangement are different but agree on the area of overlap between the first restriction and the second restriction.

5. The method of claim 3, wherein, for each vertically adjacent pair of the restrictions, a first of the restrictions has a first arrangement of the pixel blocks and a second of the restrictions has a second arrangement of the pixel blocks, wherein the first arrangement and the second arrangement are related by reflection of positions of the pixel blocks relative to a horizontal axis.

6. The method of claim 3, wherein, for each horizontally adjacent pair of the restrictions, a first of the restrictions has a first arrangement of the pixel blocks and a second of the restrictions has a second arrangement of the pixel blocks, wherein the first arrangement and the second arrangement are related by reflection of positions of the pixel blocks relative to a vertical axis.

7. The method of claim 1, wherein the number $N_{sub}$ of light modulating elements in each of the virtual sub-regions is the same, wherein the number of the spatial patterns is less than or equal to the number $N_{sub}$.

8. The method of claim 1, further comprising generating each of the spatial patterns by:
   selecting a basic pattern of distinct pixel blocks to cover a first of the virtual sub-regions; and
   for each of the remaining virtual sub-regions, generating a permuted version of the basic pattern based on a respective permutation on positions of the pixel blocks within the basic pattern, wherein said generating is performed by said processing unit.

9. The method of claim 8, wherein the respective permutation is selected from a set including the identity map, horizontal reflection and vertical reflection, wherein, for any given spatial pattern, each pair of permuted versions corresponding to adjacent ones of the virtual sub-regions are generated using different permutations from the set of permutations.

10. The method of claim 1, wherein each of the virtual sub-regions is a rectangle of the same size, wherein the method further comprises generating each of the spatial patterns by:
    selecting a basic pattern of pixel blocks, wherein the basic pattern is a proper superset of a first of the virtual sub-regions; and
    spatially repeating the basic pattern in both the vertical and horizontal directions.

11. The method of claim 1, wherein, for each light sensing element, the corresponding virtual sub-region includes the set of light modulating elements from which the light sensing element receives modulated light.

12. The method of claim 1, further comprising:
    combining the sub-images to form the image, wherein said combining is performed by said processing unit.

13. The method of claim 12, further comprising:
    displaying the image using a display device.

14. A system comprising:
    an imaging device including a light modulation unit and a plurality of light sensing elements, wherein the light modulation unit is configured to modulate an incident stream of light with a temporal sequence of spatial patterns, wherein each of the light sensing elements is configured to receive modulated light predominantly from a respective one of an array of physical sub-regions of the light modulation unit but to a lesser degree from adjacent ones of the physical sub-regions due to optical crosstalk, wherein each of the light sensing elements generates a corresponding set of samples representing intensity over time of the modulated light that it receives;
    a processing unit configured to generate the spatial patterns and to reconstruct an image based on the sample sets generated by the light sensing elements, wherein said spatial patterns and said reconstruction account for the optical crosstalk between the physical sub-regions;
    wherein said reconstructing the image includes:
        reconstructing sub-images of the image corresponding respectively to virtual sub-regions of the light modulation unit, wherein each of the virtual sub-regions is a proper superset of a respective one of the physical sub-regions, wherein each adjacent pair of the virtual sub-regions overlap, wherein each sub-image corresponds to a respective one of the light sensing elements and is reconstructed using: (a) a respective one of the sample sets and (b) a restriction of the spatial patterns to the corresponding virtual sub-region of the light modulation unit.

15. The system of claim 14, wherein the light sensing elements are arranged in an array.

16. The system of claim 14, wherein the spatial patterns are incoherent with respect to a sparsity pattern set in which the image is sparse.

17. The system of claim 14, wherein the processing unit is configured to display the image on a display device.

18. The system of claim 14, wherein the number of samples in each sample set is smaller than the number of light modulating elements in the corresponding physical sub-region of the array.

19. A non-transitory memory medium for reconstructing an image using data captured by an imaging device, wherein the imaging device includes a light modulation unit and an array of light sensing elements, wherein the light modulation unit includes an array of light modulating elements, wherein the light modulation unit modulates an incident light stream with a temporal sequence of spatial patterns, wherein each of the light sensing elements receives modulated light predominantly from a respective one of an array of physical sub-regions of the light modulation unit but to a lesser degree from adjacent ones of the physical sub-regions due to optical crosstalk, wherein each of the light sensing elements generates a corresponding set of samples representing intensity over time of the modulated light that it receives, wherein the memory medium stores program instructions, wherein the program instructions, when executed by a processor, cause the processor to:
    reconstruct sub-images of the image corresponding respectively to virtual sub-regions of the light modulation unit, wherein each of the virtual sub-regions is a proper superset of a respective one of the physical sub-regions, wherein each adjacent pair of the virtual sub-regions overlap, wherein each sub-image corresponds to a respective one of the light sensing elements and is reconstructed using: (a) a respective one of the sample sets and (b) a restriction of the spatial patterns to the corresponding virtual sub-region of the light modulation unit, wherein said reconstructing is performed by a processing unit.

\* \* \* \* \*